US012605840B2

(12) United States Patent (10) Patent No.: US 12,605,840 B2
Brulo et al. (45) Date of Patent: Apr. 21, 2026

(54) LIFT DEVICE WITH ROBOTIC WELDING ATTACHMENT INNOVATIONS

(71) Applicant: Oshkosh Corporation, Oshkosh, WI (US)

(72) Inventors: Gregory Brulo, Oshkosh, WI (US); Ignacy Puszkiewicz, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 94 days.

(21) Appl. No.: 18/144,078

(22) Filed: May 5, 2023

(65) Prior Publication Data

US 2023/0356402 A1 Nov. 9, 2023

Related U.S. Application Data

(60) Provisional application No. 63/338,932, filed on May 6, 2022.

(51) Int. Cl.
*B25J 9/16* (2006.01)
*B25J 13/08* (2006.01)
(Continued)

(52) U.S. Cl.
CPC ............. *B25J 9/1682* (2013.01); *B25J 9/162* (2013.01); *B25J 9/1697* (2013.01); *B25J 13/088* (2013.01);
(Continued)

(58) Field of Classification Search
CPC ........ B25J 9/162; B25J 9/1669; B25J 9/1682; B25J 9/1697; B25J 5/00–06;
(Continued)

(56) References Cited

U.S. PATENT DOCUMENTS

| 5,107,954 A | 4/1992 | Fujimoto |
| 5,286,159 A | 2/1994 | Honma |

(Continued)

FOREIGN PATENT DOCUMENTS

| CN | 205834449 U | * | 2/2021 |
| FR | 2847505 B1 | | 5/2004 |

(Continued)

OTHER PUBLICATIONS

L.K. Goodwin Co., "Aluminum T-Frame—air/pneumatic tire gantry cranes 1,000 & 2,000 LB. capacity AC "air caster" gantry", Accessed Nov. 30, 2021, https://www.Ikgoodwin.com/more_info/aluminum_t_frame_air_pneumatic_tire_gantry_cranes/aluminum_t_frame_air_pneumatic_tire_gantry_cranes.shtml (Year: 2021).*

(Continued)

*Primary Examiner* — Spencer D Patton
(74) *Attorney, Agent, or Firm* — FOLEY & LARDNER LLP

(57) ABSTRACT

A lift device includes a lift apparatus configured to raise and lower a robotic attachment and a base assembly configured to support the lift apparatus. The base assembly includes a prime mover configured to rotate one or more wheels coupled to the base assembly. The lift device also includes a controller in communication with at least one of the lift apparatus and the robotic attachment. The robotic attachment includes robotic implement moveable independent of the lift apparatus, a stabilizer bar coupled to the robotic implement and configured to selectively provide a stabilizing force to the robotic attachment, and a locking mechanism configured to selectively hold the stabilizer in a locked position.

11 Claims, 19 Drawing Sheets

(51) Int. Cl.
  *B25J 19/00*    (2006.01)
  *B66F 11/04*    (2006.01)
  *B66F 17/00*    (2006.01)

(52) U.S. Cl.
  CPC ......... *B25J 19/0008* (2013.01); *B66F 11/046*
                (2013.01); *B66F 17/006* (2013.01)

(58) Field of Classification Search
  CPC .... B25J 13/088; B25J 13/089; B25J 19/0008;
                B66F 9/06; B66F 9/063; B66F 11/04;
                B66F 11/044; B66F 11/046; B66F 17/006
  See application file for complete search history.

(56)            References Cited

U.S. PATENT DOCUMENTS

| | | | | |
|---|---|---|---|---|
| 5,340,187 | A | * | 8/1994 | Haddad, Jr. .............. B60J 7/085 |
| | | | | 160/71 |
| 5,538,207 | A | | 7/1996 | O'Connell et al. |
| 6,325,749 | B1 | | 12/2001 | Inokuchi et al. |
| 6,520,359 | B2 | * | 2/2003 | Richter ................. B66C 23/705 |
| | | | | 212/292 |
| 7,182,173 | B2 | | 2/2007 | Bailey |
| 9,409,292 | B2 | | 8/2016 | Smith et al. |
| 10,207,412 | B2 | | 2/2019 | Kullborg et al. |
| 10,920,434 | B1 | * | 2/2021 | Pearson, Jr. ............ E04G 21/22 |
| 11,951,617 | B2 | * | 4/2024 | Zhou ...................... G05D 1/243 |
| 2012/0277915 | A1 | | 11/2012 | Jacobsen et al. |
| 2017/0291802 | A1 | | 10/2017 | Hao et al. |
| 2017/0291805 | A1 | | 10/2017 | Hao et al. |
| 2018/0162704 | A1 | | 6/2018 | Hao et al. |
| 2019/0071291 | A1 | | 3/2019 | Puszkiewicz et al. |
| 2019/0119088 | A1 | | 4/2019 | Puszkiewicz et al. |
| 2019/0185301 | A1 | | 6/2019 | Hao et al. |
| 2019/0322512 | A1 | | 10/2019 | Puszkiewicz et al. |
| 2019/0352157 | A1 | | 11/2019 | Hao et al. |
| 2020/0031641 | A1 | | 1/2020 | Puszkiewicz et al. |
| 2020/0317486 | A1 | | 10/2020 | Puszkiewicz et al. |
| 2021/0002112 | A1 | | 1/2021 | Puszkiewicz et al. |
| 2021/0155463 | A1 | | 5/2021 | Hao et al. |
| 2021/0276841 | A1 | | 9/2021 | Borofka et al. |
| 2021/0276848 | A1 | | 9/2021 | Miller et al. |
| 2021/0395058 | A1 | | 12/2021 | Hao et al. |
| 2022/0134946 | A1 | | 5/2022 | Brulo |
| 2022/0194769 | A1 | | 6/2022 | Kobel et al. |
| 2022/0198905 | A1 | | 6/2022 | Brulo et al. |
| 2022/0234873 | A1 | | 7/2022 | Miller et al. |
| 2023/0183050 | A1 | | 6/2023 | Puszkiewicz et al. |
| 2023/0356402 | A1 | | 11/2023 | Brulo et al. |

FOREIGN PATENT DOCUMENTS

| | | |
|---|---|---|
| GB | 2 569 414 A | 6/2019 |
| JP | H01-231800 A | 9/1989 |
| JP | H06-007723 B2 | 1/1994 |

OTHER PUBLICATIONS

International Search Report and Written Opinion issued in connection with PCT Appl. No. PCT/US2023/021250 dated Oct. 10, 2023, 17 pps.

Invitation to Pay Additional Fees issued in connection with PCT Appl. No. PCT/US2023/021250 dated Aug. 16,2 023.

International Search Report and Written Opinion issued in connection with PCT Appl. No. PCT/US2023/021252 dated Aug. 16, 2023.

* cited by examiner

600

608

606

604

1700

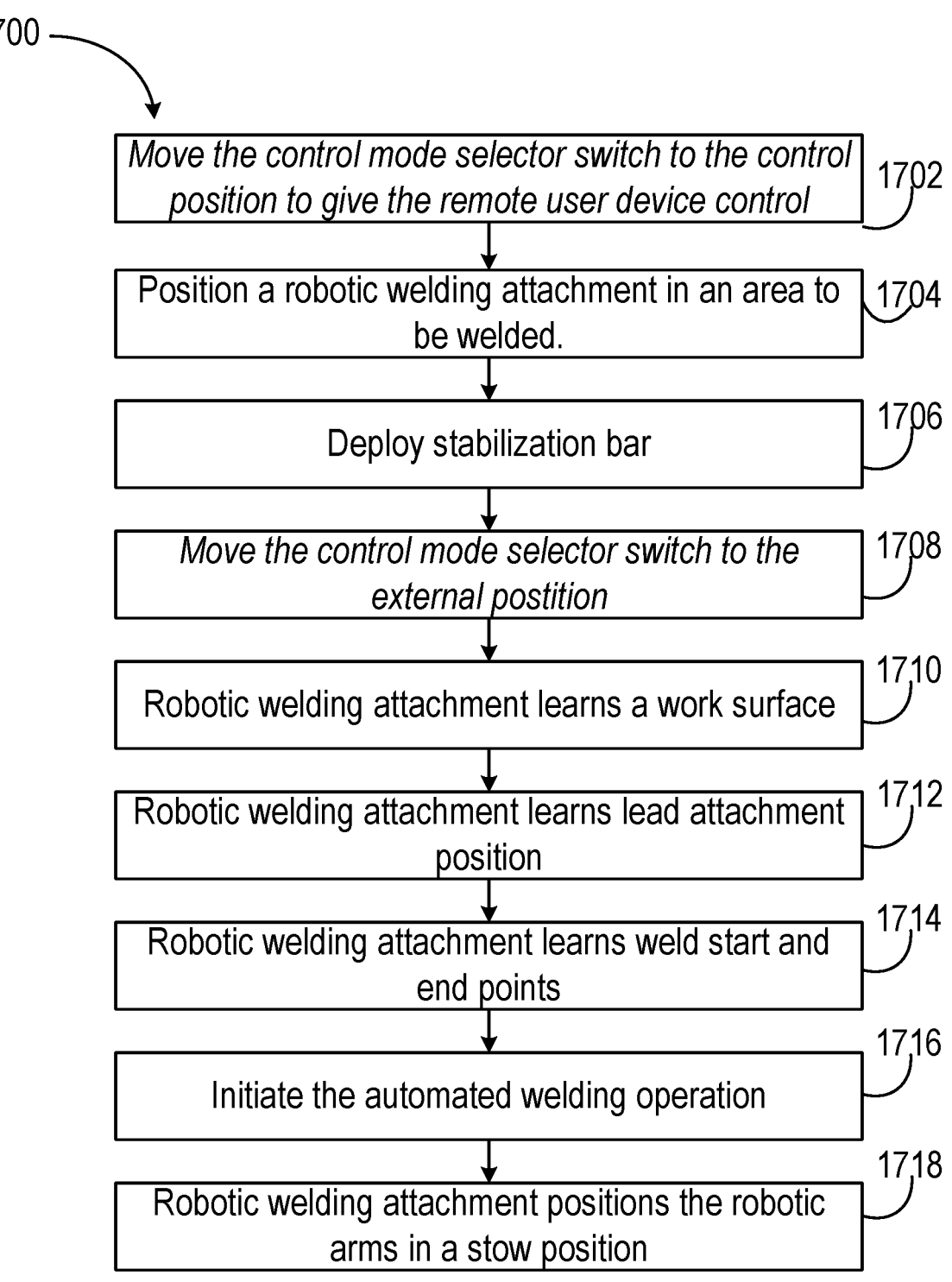

*Move the control mode selector switch to the control position to give the remote user device control*   1702

Position a robotic welding attachment in an area to be welded.   1704

Deploy stabilization bar   1706

*Move the control mode selector switch to the external postition*   1708

Robotic welding attachment learns a work surface   1710

Robotic welding attachment learns lead attachment position   1712

Robotic welding attachment learns weld start and end points   1714

Initiate the automated welding operation   1716

Robotic welding attachment positions the robotic arms in a stow position   1718

1802
Autonomously couple a weld lead to a work piece using a robot

1804
Autonomously weld between end points using the robot

1806
Autonomously cleans the weld using the robot

1808
Autonomously remove the weld leads using the robot

1810
Autonomously stow the robots

LIFT DEVICE WITH ROBOTIC WELDING ATTACHMENT INNOVATIONS

CROSS-REFERENCE TO RELATED PATENT APPLICATIONS

This application claims the benefit of and priority to U.S. Provisional Application No. 63/338,932, filed on May 6, 2022, the entire disclosure of which is hereby incorporated by reference herein.

BACKGROUND

The present application generally relates to lift devices. More particularly, the present application relates to mobile elevated work platforms.

SUMMARY

One embodiment relates to a lift device including a lift apparatus configured to raise and lower a robotic attachment and a base assembly configured to support the lift apparatus, the base assembly including a prime mover configured to rotate one or more wheels coupled to the base assembly. The robotic attachment includes a base, a robotic implement supported by the base and moveable independent of the base, a stabilizer bar coupled to the base and moveable independent of the base, a stabilizer bar actuator configured to move the stabilizer bar relative to the base, and a locking mechanism configured to selectively hold the stabilizer in position.

Another embodiment relates to a lift device including a lift apparatus configured to raise and lower a robotic attachment. The robotic attachment includes a base, a primary robotic implement supported by the base, and a secondary robotic implement supported by the base, wherein the primary robotic implement and the secondary robotic implement are moveable independent of each other. The lift device further includes a base assembly configured to support the lift apparatus, the base assembly including a prime mover configured to rotate one or more wheels coupled to the base assembly, a stabilizer supported by the base assembly, and a control system communicably coupled to the lift device and the robotic attachment. The control system includes a processing circuit configured to control the movement of at least one of the primary robotic implement or the secondary robotic implement, and control at least one of the other of the at least one of the primary robotic implement or the secondary robotic implement or the stabilizer to counteract momentum generated by the movement of the at least one of the primary robotic implement or the secondary robotic implement.

Another embodiment relates to a lift device including a lift apparatus configured to raise and lower a robotic attachment comprising a weld controller configured to control the robotic attachment to automatically perform a welding operation, a base assembly configured to support the lift apparatus, the base assembly including a prime mover configured to rotate one or more wheels coupled to the base assembly, an external controller in communication with the lift apparatus and the robotic attachment, a control system configured to provide control of the lift device to the external controller when a first signal is received and provide control of the lift device to the weld controller when a second signal is received.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 17 is a flow diagram of an weld process performed by the lift device of FIG. 1, according to an exemplary embodiment.

DETAILED DESCRIPTION

Figure 1:
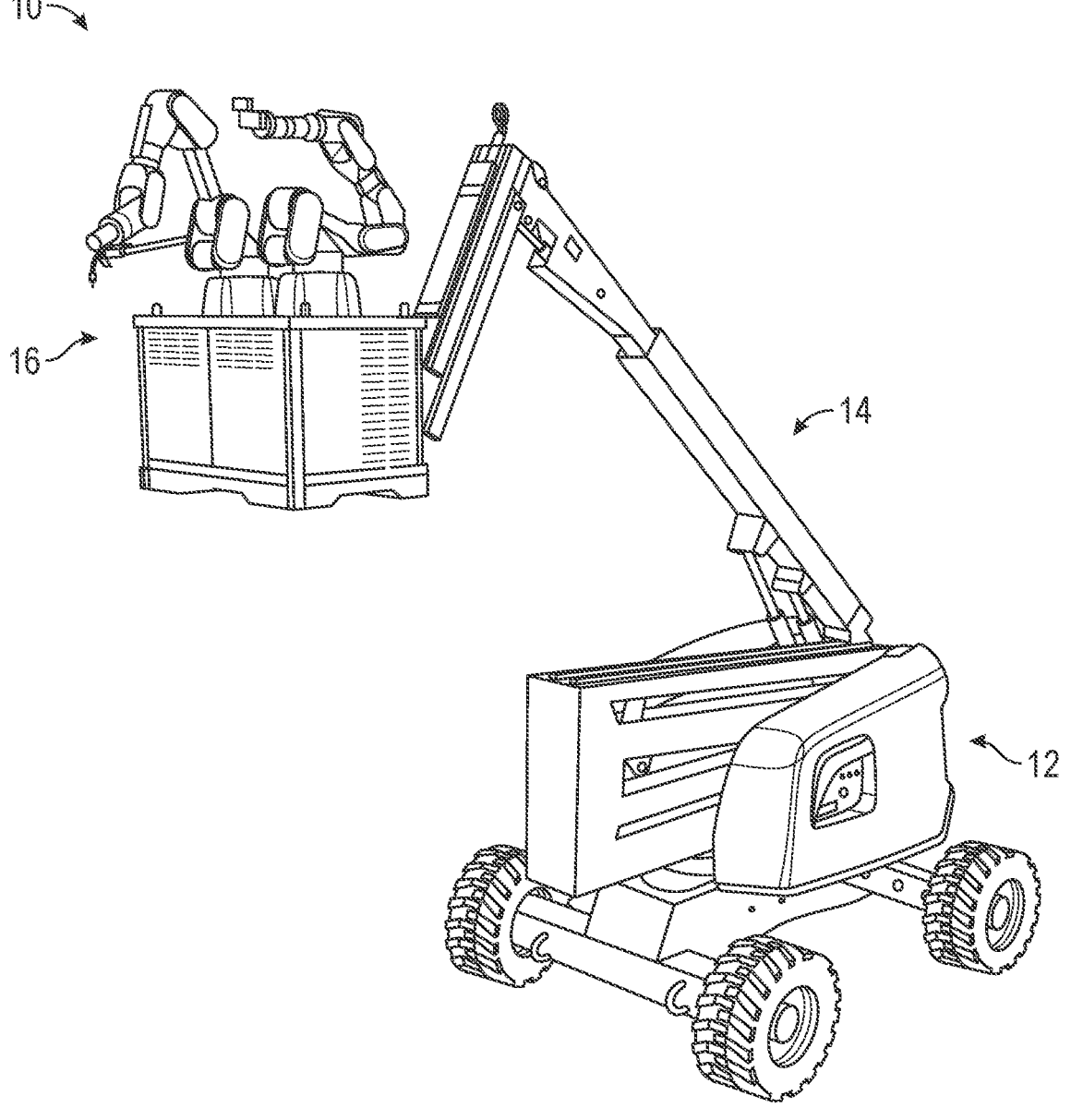
FIG. 1 is a front perspective view of a lift device, according to an exemplary embodiment.

Before turning to the figures, which illustrate certain exemplary embodiments in detail, it should be understood that the present disclosure is not limited to the details or methodology in the description or illustrated in the figures. It should also be understood that the terminology used herein is for description only and should not be regarded as limiting.

Referring generally to the FIGURES, a lift device (e.g., a boom, an articulated boom, a lift, a MEWP, a telehandler, etc.) includes a lift apparatus (e.g., a telescoping arm, an articulated arm, a boom arm, a boom, etc.) and a base supporting the lift apparatus. The lift apparatus is coupled to a robotic welding attachment. The robotic welding attachment includes a platform (e.g., cabinet, container, base, structural member, etc.) coupled to the lift apparatus. Specifically, the platform is rotatably coupled to the lift apparatus. The platform can include a plurality of couplings for power, high pressure air, hydraulics, and communication, etc., to connect the platform with the lift device. The platform includes a mechanical stabilizer (e.g., bar, hook, vacuum attachment, etc.) which selectively extends from the platform and contacts an external support to provide a stabilizing force supporting the platform when lifted by the lift device. The platform supports one or more robotic implements (e.g., robotic arms, actuators, manipulators, or other manipulable devices), such as a primary arm and a secondary arm. The primary and secondary robotic arms can be remotely operated by a user and/or autonomously operated to complete a welding operation. The primary and secondary robotic arms can detachably couple to several end effectors for performing different tasks. The end effectors may include but are not limited to, a position sensor such as touch sensor, a welding gun, a primary arm wrist camera, a detachable lead, a needle scaler, or a secondary arm wrist camera. The detachable lead includes a ground lead and a voltage sensor lead for welding operations to complete a welding circuit for the welding gun.

According to an exemplary embodiment, the lift device and robotic welding assembly of the present disclosure include a control system. The control system includes one or more controllers configured to operate the lift device and/or the robotic welding attachment according to different modes. In some embodiments, a single controller controls both the lift device and the robotic welding attachment. In other embodiments, there are dedicated controllers for each of the lift device and the robotic welding attachment. The modes include a manual mode and an autonomous mode. When operated in a manual mode, a user can control the lift device to position the robotic welding assembly near an external object such as a work piece. When operated in a manual mode, a user can extend the stabilizer to contact an external support in front of the robotic welding attachment, stabilizing the robotic welding attachment. When the robotic welding attachment is operated in a manual mode, a user can control the primary arm to move the touch probe to locate the work piece, a lead point, a weld start point, and a weld end point.

According to an exemplary embodiment, when the robotic welding attachment is operated in an autonomous mode, the robotic welding attachment can autonomously place one or more detachable leads including a ground lead and a voltage sensor lead at a learned lead point on the work piece, in manner similar to that in the manual mode. When operated in an autonomous mode, the robotic welding attachment can autonomously use the primary arm to manipulate the touch probe to locate the work piece, the lead point, the weld start point, and the weld end point. The primary arm can also manipulate the weld gun to weld between the learned weld start point and weld end point.

When operating in an autonomous mode, the robotic welding attachment can autonomously operate the secondary arm to remove the scale from the weld with the needle scaler. When operated in an autonomous mode, the robotic welding attachment can operate the secondary arm to autonomously remove the detachable leads from the work piece. When operated in an autonomous mode, the robotic welding attachment can autonomously move the primary arm and the secondary arm to a stow position for movement of the robotic welding attachment to a new weld site. Such a lift device with a robotic welding attachment helps with completing a remote controlled welding operation at height.

Lift Device

Figure 2:
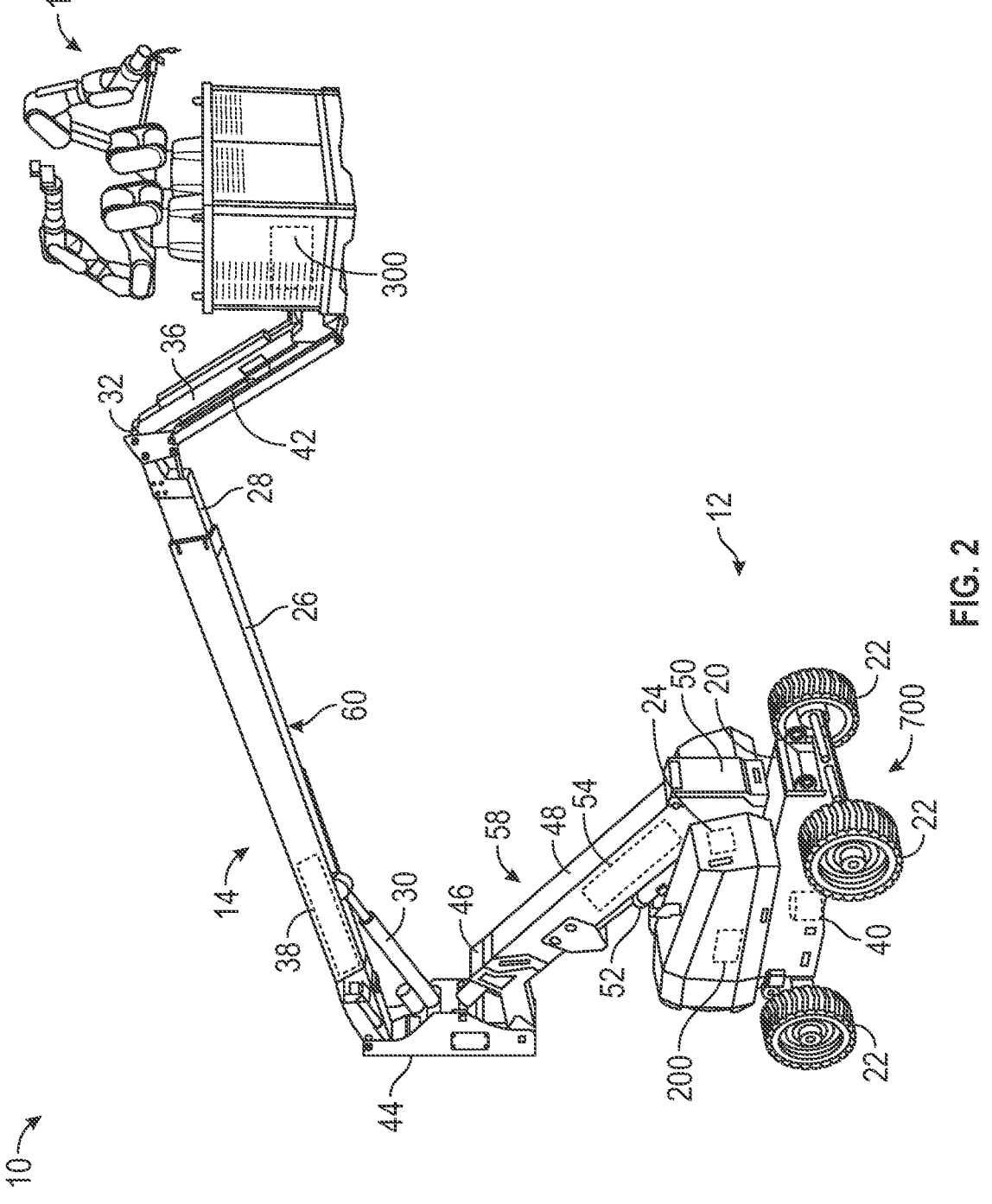
FIG. 2 is a front perspective view of the lift device of FIG. 1 in an extended position, according to an exemplary embodiment.
Figure 3:
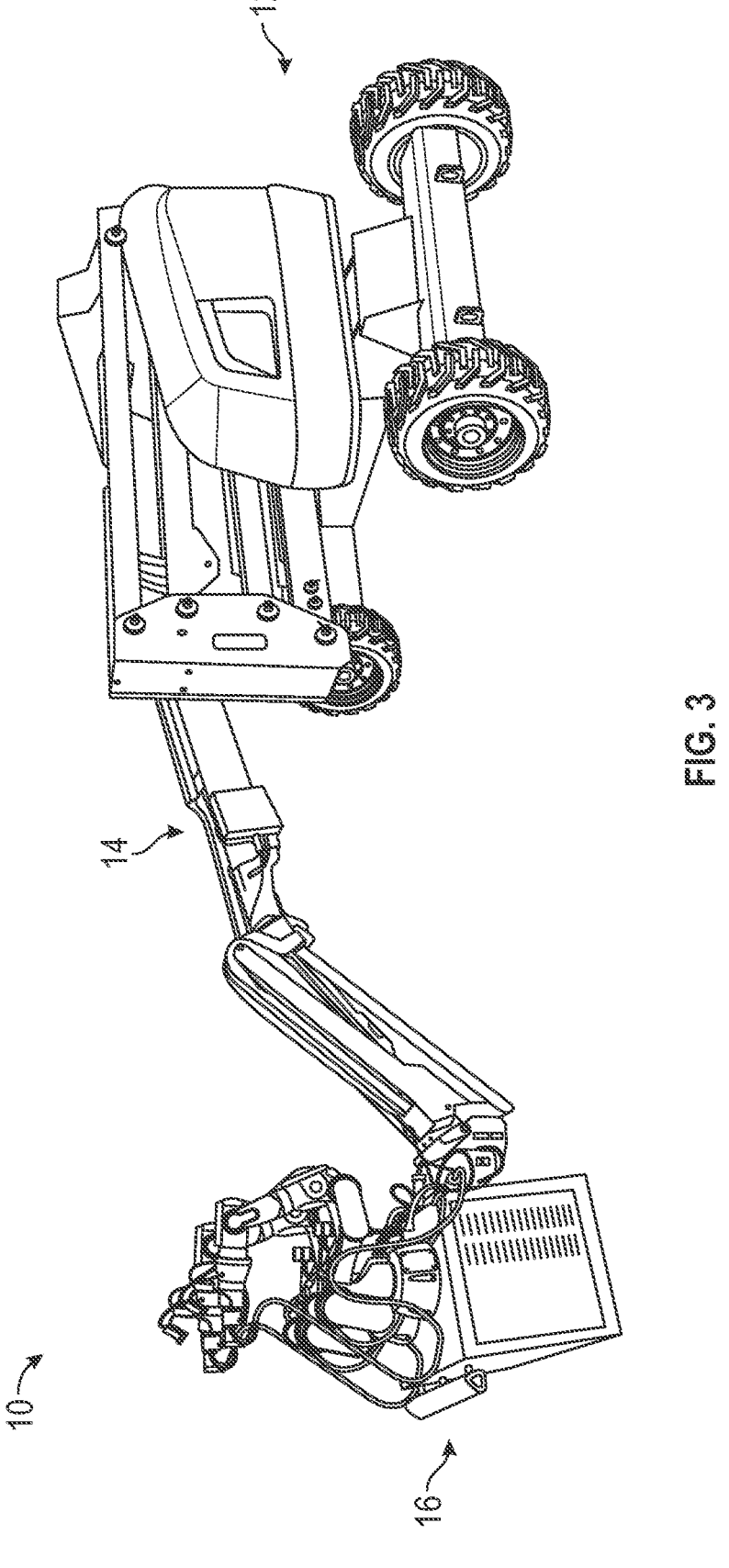
FIG. 3 is a front prospective view of the lift device of FIG. 1 in a compact position, according to an exemplary embodiment.

According to the exemplary embodiment shown in FIGS. 1-3, a lift device, a boom, an articulated boom, a lift, a MEWP, a telehandler, etc., shown as lift device 10 includes a base assembly 12 (e.g., a base, a main body, a vehicle, etc.), a lift apparatus 14 (e.g., a telescoping arm, an articulated arm, a boom arm, a boom, etc.), and an robotic attachment (e.g., a platform, a platform assembly, a work platform, a fork assembly, an apparatus, etc.), shown as robotic welding attachment 16. The robotic welding attachment 16 may be detachably coupled to the lift apparatus 14 such that the robotic welding attachment 16 can be removed and replaced with a different implement assembly.

According to an exemplary embodiment, the lift device 10 is configured to move between an extended work configuration (i.e., an operating position) and a more compact position (i.e., a stow position). In the operating position, the lift apparatus 14 and robotic welding attachment 16 are extended upward, outward, and forward from the frame 20 and forward from the lift device 10, generally. In the stow position, the robotic welding attachment 16 is retracted inward, nearer the frame 20. In some embodiments, the lift device 10 can also be positioned in a plurality of other positions.

According to the exemplary embodiment shown in FIG. 2, base assembly 12 includes a frame 20 (e.g., a carriage, a structural member, a support member, a chassis, a frame member, etc.), and multiple tractive elements 22 (e.g., wheels, treads, rotatable members, rollers, etc.). Base assembly 12 also includes a primary mover (e.g., an electric motor, an internal combustion engine, a hydraulic motor, a pneumatic motor, etc.), shown as electric motor 24. Electric motor 24 can be configured to provide mechanical power (e.g., rotational kinetic energy) to tractive elements 22 (e.g., through a transmission, a power transmitting system, one or more gearboxes, etc.) for transportation of lift device 10. Electric motor 24 may also provide power for operation of lift apparatus 14, a steering system of lift device 10, deployment of a deployable operator station of lift device 10, etc., or for any other function, feature, etc., of lift device 10 that requires power to operate. Electric motor 24 may represent a single motor or a collection of electric motors configured to consume or receive electrical energy from one or more batteries, power cells, capacitors, power storage devices, power storage systems, external supplies, etc., shown as electrical energy storage devices 40 to generate the mechanical power. Tractive elements 22 can receive the mechanical power from electric motor 24 and rotate relative to frame 20. Tractive elements 22 can each be pivotally or rotatably coupled with frame 20 so tractive elements 22 can rotate relative to frame 20 to help with a driving or transport operation of lift device 10 (e.g., to transport lift device 10 from one jobsite to another jobsite).

The tractive elements 22 may include a first or a front pair of tractive elements and a second or rear pair of tractive elements. The pairs of tractive elements 22 may each be rotatably or pivotally coupled with a corresponding axle (e.g., a front axle and a rear axle, respectively) that is fixedly coupled, integrally formed, welded, fastened, etc., with frame 20. One or both of the axles may include one or more steering members (e.g., tie-rods, elongated members, etc.) that are configured to pivot or rotate tractive elements about a steering axis to indicate a direction of turn of lift device 10. In this way, electric motor 24 and tractive elements 22 can help with the transportation of lift device 10 from one location to another. The medial member 36 can be rotated rearward, so the implement assembly rotates upward, over a part of the frame 20. Similarly, the intermediate member 44 can also rotate rearward, which urges the outer member 26 and entire lift apparatus 14 and robotic welding attachment 16 rearward, toward and over the frame 20. Traditional lift devices have long booms, which typically results in the implement assembly being positioned well forward of the lift chassis. This conventional configuration makes transportation difficult, as the distance between the chassis and implement significantly limits over-the-road transport on trailers. Using the multi-telescoping boom lift apparatus 14 of the lift device 10, significant space savings are realized. The robotic welding attachment 16 is retracted and rotated to be positioned nearly entirely (e.g., at least 50%) over the frame 20. Accordingly, trailer or other types of transport are significantly improved relative to conventional lifts, as the footprint of the lift device 10 is significantly limited.

The lift apparatus 14 is or includes a pair of articulated telescoping members, shown as first telescoping member 58 and second telescoping member 60 that are pivotally or hingedly coupled at intermediate member 44. Second telescoping member 60 includes an outer member 26 (e.g., a first member) and an inner member 28. Inner member 28 can be received within an inner volume of outer member 26 and may be configured to slide, translate, etc., relative to outer member 26. In some embodiments, inner member 28 and outer member 26 are slidably coupled so an overall length of the second telescoping member 60 can be increased or decreased to help with raising or lowering robotic welding attachment 16. Inner member 28 and outer member 26 may be configured to extend or retract through operation of a primary mover, a linear electric actuator, an electric motor, a hydraulic cylinder, a pneumatic cylinder, etc., shown as linear electric actuator 38. Linear electric actuator 38 may draw electrical power or electrical energy from one or more batteries, power sources, energy storage devices, etc., of lift device 10 (e.g., from electrical energy storage devices 40) and use the electrical energy to operate to extend or retract, driving inner member 28 to translate relative to outer member 26 (and raising or lowering robotic welding attachment 16 to reach an elevated location).

The outer member 26 can receive inner member 28 through a first or proximate end and may be rotatably or hingedly coupled with intermediate member 44 at a second or opposite end. Specifically, outer member 26 may be hingedly or rotatably coupled with an upper part or corner of intermediate member 44. Outer member 26 can be driven to rotate or pivot relative to intermediate member 44 to raise or lower robotic welding attachment 16 by a linear actuator, an electric motor, a linear electric actuator, a pneumatic actuator, a hydraulic cylinder, etc., shown as linear electric actuator 30. Linear electric actuator 30 can be pivotally coupled at a first end with outer member 26 and at a second end with a part of intermediate member 44.

The lift apparatus 14 can include an intermediate member, an elongated member, etc., shown as medial member 36.

Medial member 36 can be pivotally coupled with inner member 28 through a hinge, a pin, a hinged coupling, etc., shown as pin 32. Inner member 28 may extend into an inner volume of outer member 26 at a first end and rotatably couple with medial member 36 at an opposite or second end. Medial member 36 can be configured to be driven to rotate about pin 32 to pivot or rotate robotic welding attachment 16 through a linear electric actuator 42. Linear electric actuator 42 may be pivotally coupled at a first end with medial member 36 and pivotally coupled at a second end with inner member 28 so extension or retraction of linear electric actuator 42 drives rotation of medial member 36 and robotic welding attachment 16 about pin 32 relative to inner member 28.

The first telescoping member 58 of lift apparatus 14 can include an outer member 48 and an inner member 46. Outer member 48 may receive inner member 46 through an inner volume so inner member 46 can slidably couple with outer member 48. Inner member 46 may be rotatably or hingedly coupled with intermediate member 44 (e.g., at a bottom portion of intermediate member 44). In some embodiments, a first or proximate end of inner member 46 extends into outer member 48 and a second or distal end of inner member 46 is rotatably or hingedly coupled with intermediate member 44. Outer member 26 may also hingedly or rotatably couple with intermediate member 44 (e.g., at an upper end of intermediate member 44). In this way, intermediate member 44 may be a linkage or intermediate member that hingedly, rotatably, or pivotally couples with outer member 26 at a first end (e.g., an upper end) and hingedly, rotatably or pivotally couples with inner member 46 at a second end (e.g., a lower end). Intermediate member 44 may be an upright structural member that forms a linkage between the second telescoping member 60 formed by outer member 26 and inner member 28 and the first telescoping member 58 or apparatus formed by inner member 46 and outer member 48. Inner member 46 and outer member 48 may form a telescoping member that is the same as or similar to the second telescoping member 60 formed by inner member 28 and outer member 26. The first telescoping member 58 (formed by outer member 48 and inner member 46) may extend from a front or forwards portion of lift device 10 in a rearwards direction (e.g., from base assembly 12 or frame 20) while the first telescoping member (formed by outer member 26 and inner member 28) may extend from a rearwards portion or area of lift device 10 (e.g., from intermediate member 44) in a forwards direction.

The outer member 48 can be rotatably, pivotally, or hingedly coupled with base assembly 12 through a support member 50. Support member 50 can be fixedly coupled with base assembly 12 or frame 20 and can include a portion configured to receive an end of outer member 48 and pivotally couple with the end of outer member 48. Lift apparatus 14 also includes a linear electric actuator 52 configured to pivotally or hingedly couple at one end with base assembly 12 (e.g., with support member 50) and a second end or an opposite end with outer member 48. Linear electric actuator 52 can be configured to extend or retract to pivot outer member 48 relative to support member 50.

The lift apparatus 14 can include a linear electric actuator 54 configured to extend or retract to drive inner member 46 to translate relative to outer member 48. In some embodiments, linear electric actuator 54 is positioned within outer member 48 so extension of linear electric actuator 54 drives inner member 46 to translate to increase an overall length of inner member 46 and outer member 48 while retraction of linear electric actuator 54 drives inner member 46 to translate to decrease the overall length of inner member 46 and outer member 48. It should be understood that linear electric actuator 52 and linear electric actuator 54 may be the same as or similar to the other linear electric actuators described (e.g., linear electric actuator 42) and can be configured to receive or obtain electrical energy or electrical power from electrical energy storage devices 40. In some embodiments, linear electric actuator 52 and linear electric actuator 54 are also configured to receive control signals from a control system, such as control system 1200 below, and use the control signals to operate to perform a requested function of lift apparatus 14.

According to the exemplary embodiment in FIGS. 1-3, the lift device 10 is shown configured as a fully electric telehandler that uses linear electric actuator 52, linear electric actuator 54, linear electric actuator 30, and linear electric actuator 38 to raise or lower implement attachment 16. However, lift device 10 may similarly be configured as a hydraulic telehandler, with linear electric actuator 52, linear electric actuator 54, linear electric actuator 30, and linear electric actuator 38 being replaced with hydraulic cylinders. In other embodiments, if lift device is a hybrid telehandler, one or more of linear electric actuator 52, linear electric actuator 54, linear electric actuator 30, or linear electric actuator 38 are replaced with hydraulic linear actuators. In still other embodiments, lift device 10 is configured as an electro-hydraulic or a hybrid telehandler. In some embodiments, lift device 10 is configured as a MEWP with a straight lift assembly.

Robotic Welding Attachment

Figure 4:
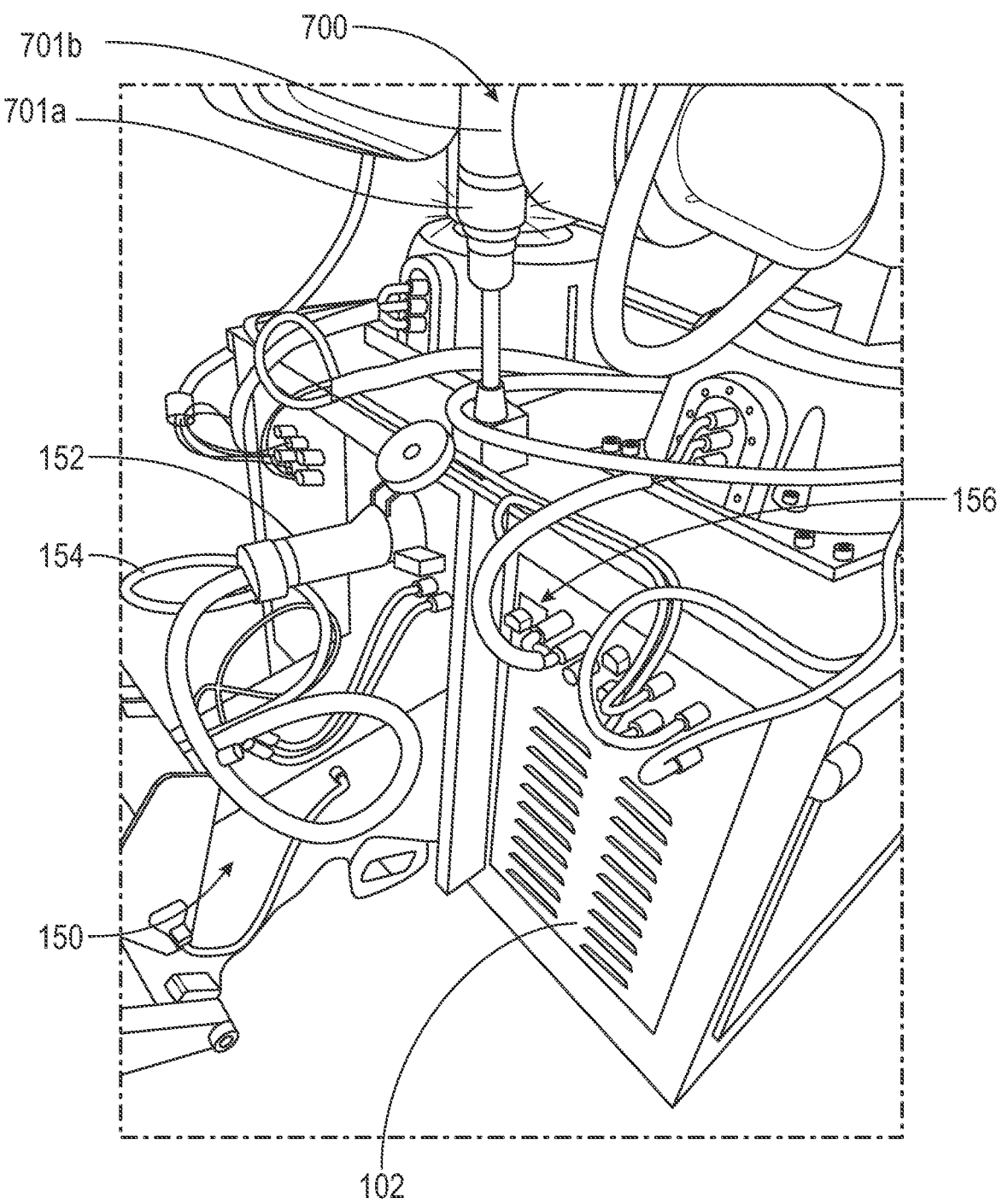
FIG. 4 is a first perspective view of the connection between a lift apparatus and a robotic welding attachment, according to an exemplary embodiment.
Figure 5:
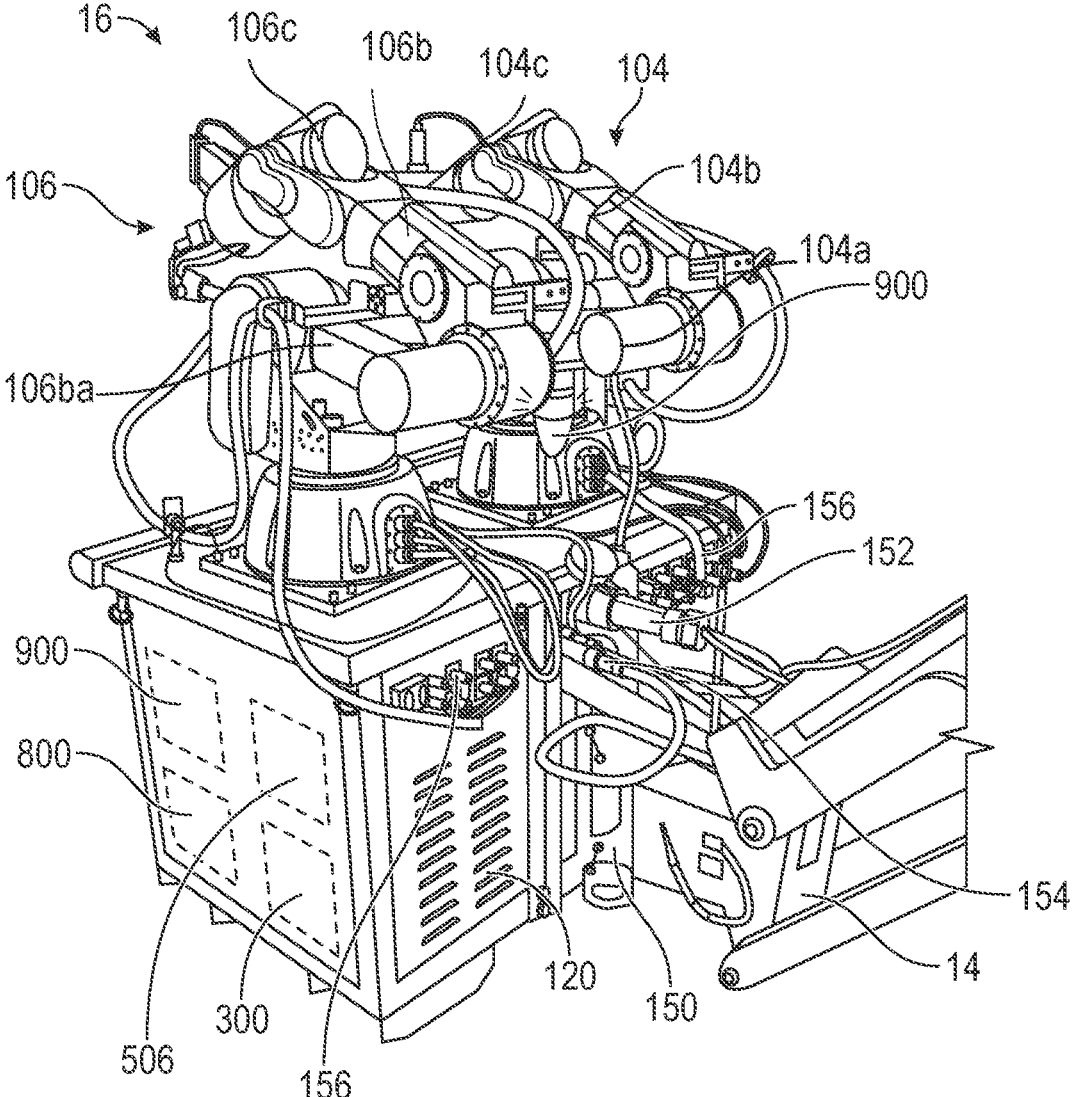
FIG. 5 is a second perspective view of the connection between a lift apparatus and a robotic welding attachment, according to an exemplary embodiment.
Figure 6:
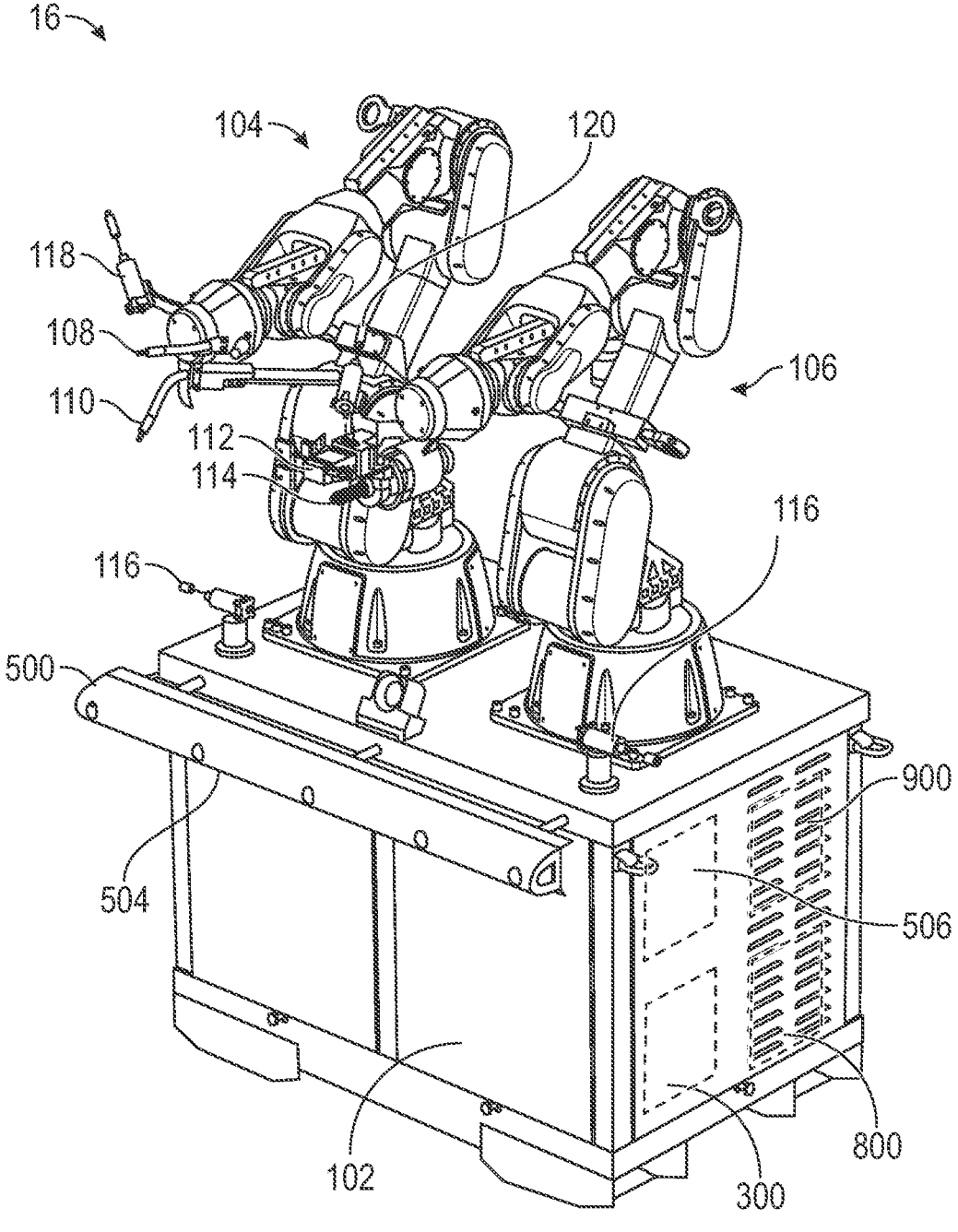
FIG. 6 is a first perspective view of a robotic welding attachment, according to an exemplary embodiment.
Figure 7:
FIG. 7 is a second perspective view of the robotic welding attachment of FIG. 6, according to an exemplary embodiment.
Figure 8:
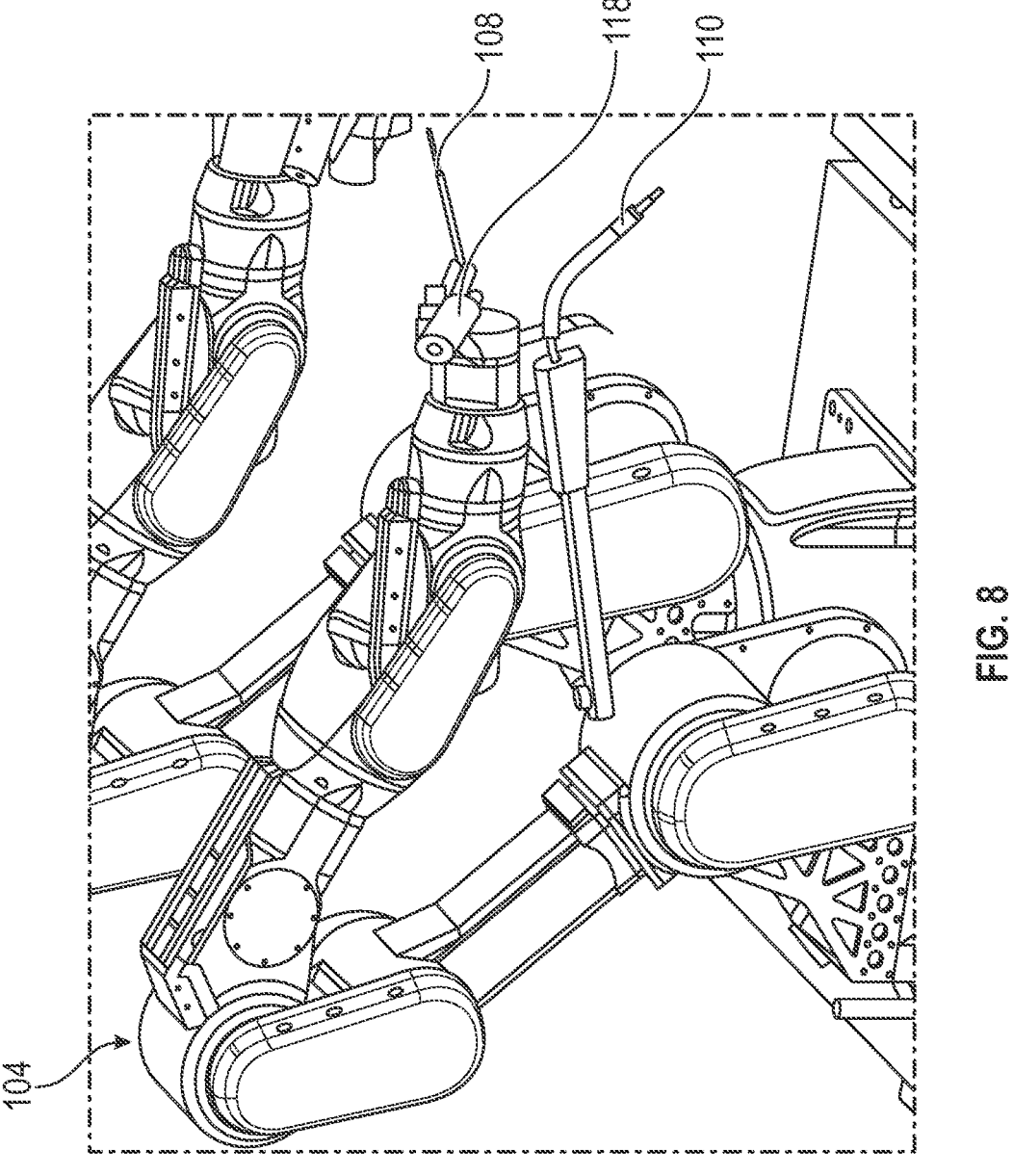
FIG. 8 is a perspective view of a primary arm of the robotic welding attachment of FIG. 6, according to an exemplary embodiment.
Figure 9:
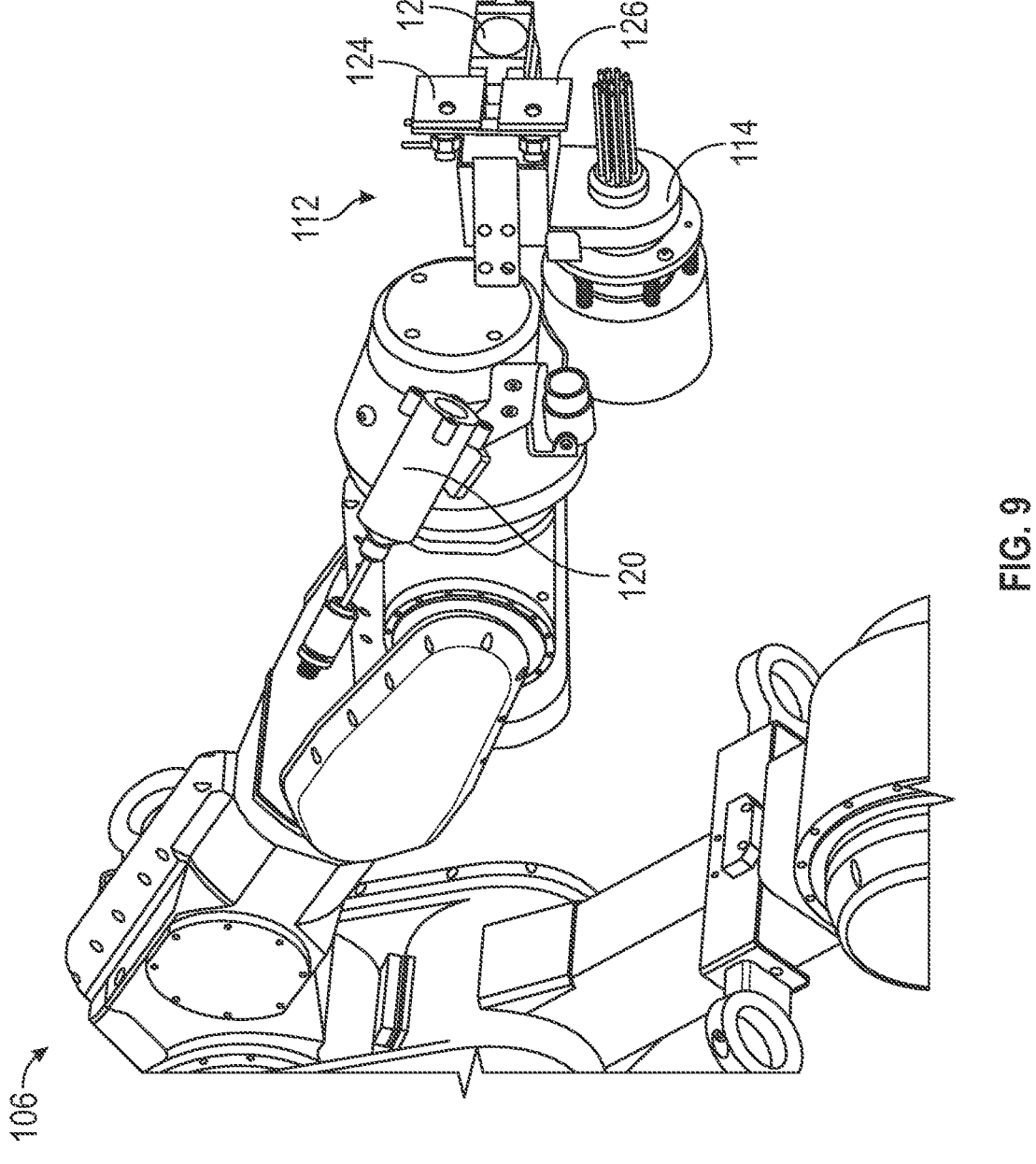
FIG. 9 is a perspective view of a secondary arm of the robotic welding attachment of FIG. 6, according to an exemplary embodiment.

According to the exemplary embodiment in FIGS. 4-5, the robotic welding attachment 16 (RWA) includes a base assembly (e.g., a cabinet, a box, a container, a base) shown as platform 102. The platform 102 is coupled to lift apparatus 14 via a coupling (i.e., attachment, linkage, pivot point, etc.,) shown as mechanical coupling 150. The mechanical coupling 150 can selectively attach the robotic welding attachment 16 to the lift apparatus 14.

According to an exemplary embodiment, the robotic welding attachment 16 is rotatably coupled to the lift apparatus 14 via the mechanical coupling 150. The mechanical coupling 150 can include one or more actuators (electric, hydraulic, pneumatic, etc.) to independently adjust the position of the robotic welding attachment 16 without moving the lift apparatus 14. In some embodiments, the mechanical coupling is a multi-axis coupling allowing for movement of the robotic welding attachment 16. For example, the mechanical coupling 150 can be a three-axis coupling. The mechanical coupling 150 can therefore position (e.g., tilt, rotate, slide) the robotic welding attachment 16 in front of a work piece in addition the vertically and laterally position the robotic welding attachment 16. For example, the robotic welding attachment 16 can tilt towards and away from a work piece, twist the primary arm 104 closer to the work piece and the secondary arm away 106, or rotate the robotic welding attachment 16 such that instead of the primary arm 104 and the secondary arm 106 being arranged horizontally, the primary arm 104 and the secondary arm 106 can be arranged vertically. In some embodiments, the robotic welding attachment 16 can be positioned via the mechanical coupling 150 to ensure one or more cameras on the robotic welding attachment 16 have a better of a work area.

According to an exemplary embodiment, an intermediate assembly between the lift apparatus 14 and the robotic welding attachment 16 can be included to position the robotic welding attachment 16 independent of movement of the lift apparatus 14. The intermediate assembly may perform the same and/or similar to the rotatable mechanical coupling 150. In some embodiments, the robotic welding attachment 16 can be detached from the intermediate assembly while the intermediate assembly remains coupled to the lift apparatus 14.

According to an exemplary embodiment, in addition to mechanical coupling 150 the lift apparatus 14 is also coupled (e.g., electrically, pneumatically, hydraulically, etc.) to the robotic welding attachment 16 via one or more other couplings, shown as power coupling 152, pneumatic coupling 154 and data couplings 156. In some embodiments, the power coupling 152 provides pass-through power to the robotic welding attachment 16 and its sub-components from an onboard power source within the lift device 10 and/or via shore power coupled to the lift device 10. For example. the power coupling 152 provides universal high voltage A/C power to the robotic welding attachment 16 for powering the primary arm 104, secondary arm 106, and various end effectors. The data couplings 156 can pass digital signals between the robotic welding attachment 16 and the lift apparatus. The digital signals can include discrete communication signals, serial communication signals, CANbus signals, and/or emergency stop signals. In some embodiments, a single data coupling 156 is provided. Still in other embodiments multiple data couplings 146 are used.

According to an exemplary embodiment, the platform 102 of the robotic welding attachment 16 is capable of operating with single-phase (1-phase) and/or three-phase (3-phase) power. The platform 102 can contain one or more electrical components (e.g., diodes, inverters, transformers, rectifiers, etc.,) for use in a 1-phase power circuit and a 3-phase power circuit, and selectively switch to the appropriate power circuit based on the power provided to the robotic welding attachment 16. For example, when the lift device is connected to 3-phase shower power the robotic welding attachment 16 can select and use the 3-phase circuit. If the lift device 10 switches to its onboard power system and to providing 1-phase power to the robotic welding attachment 16, the robotic welding attachment 16 can automatically switch to the 1-phase circuit.

According to an exemplary embodiment, the data couplings 156 facilitate communication between the robotic welding attachment 16 and the lift apparatus 14, allowing for the lift apparatus 14 and/or the robotic welding attachment 16 to control the other, and vice versa. For example, the robotic welding attachment 16 can command the lift apparatus 14 to raise or lower the robotic welding attachment 16. Relatedly, in another embodiment the lift apparatus 14 can command the robotic welding attachment 16 to begin a welding operation.

According to the exemplary embodiments shown in FIGS. 5-9, the platform 102 supports a pair of robotic implements (e.g., manipulators, arms, etc.), shown as primary arm 104 and secondary arm 106. The primary arm 104 and the secondary arm 106 are operably coupled to platform 102 for support, communication, and power, and can move independently of both the platform and each other. The primary arm 104 and secondary arm 106 can be remotely manipulated to perform a variety tasks. The primary arm 104 and the secondary arm 106 have multiple degrees of freedom which let them position themselves. In some embodiments, the primary arm 104 and the secondary arm 106 comprises a plurality of independently rotatable members pivotably coupled to each other to provide multiple degrees of freedom, shown as members 104a-104c and 106a-106c. The primary arm 104 and the secondary arm 106 each have one or more end effectors at a distal free end of the primary arm 104 and the secondary arm 106. The end effectors can include one or more tools for performing a task, and can be exchanged mid-operation for new end effectors as needed. For example, primary arm 104 and secondary arm 106 can be the RE2 Sapien™ 6M made by RE2 Robotics. Primary arm 104 and secondary arm 106 can therefore include six degrees of freedom and has wrist and elbow joints for positioning the end effectors. In some embodiments, platform 102 supports any number of robotic arms (e.g., one, two, three, or more).

According to an exemplary embodiment, primary arm 104 and secondary arm 106 are moveable to one or more preset positions. The preset positions can correspond to default positions for a plurality of operating modes. For example in a deactivated mode, the preset positions can include a stow position as shown in FIG. 5. In the stow position the primary arm 104 and the secondary arm 106 positioned with the plurality of rotatable members 104a-104c and 106a-106c substantially within the same plane, and in their unexpended state. In some embodiments, the plurality of present positions includes a transportation position for a transportation mode to reduce the overall footprint of the robotic welding attachment 16 such that transportation is easier. According to an exemplary embodiment, the preset positions can also include collision avoidance positions to increase the clearance between the primary arm 104 and the secondary 106. In the avoidance position, at least one of the primary arm 104 or the secondary arm 106 is positioned based on the position or envelope of the other of the primary arm 104 or the secondary arm 106 to make sure the primary arm 104 and the secondary arm 106 avoid contact with each other. According to an exemplary embodiment, the preset positions may also include an obstacle avoidance position to reduce the envelope of the robotic welding attachment 16, etc.

According to an exemplary embodiment, the primary arm 104 and the secondary arm 106 can be positioned to stabilize the platform 102. The stabilization positions can be used to change the natural oscillation frequencies of the robotic welding attachment 16, to counter act the movements of the other arm and/or the lift apparatus 14, and to dampen or counteract oscillations or movements in the position of the robotic welding attachment 16 itself. For example, during a welding operation the primary arm 104 is manipulating a welder to perform a welding operation. The mass of the moving primary arm 104 can introduce movement into the position of the robotic welding attachment 16. To minimize the unintended movement in the position of the robotic welding attachment 16, the secondary arm can be moved to counteract the movements of the primary arm 104. In some embodiments, the stabilization positions can be used in addition to one or more other means of stabilizing the platform 102. For example, upon disengagement of the stabilizer bar with an external support, the robotic welding attachment 16 can start to oscillate due to minor differences in the position the robotic welding attachment 16 was in when supported by the stabilizer bar and the position the robotic welding attachment 16 is now held in solely by the lift apparatus 14. The primary arm 104 and the secondary arm 106 can be moved to counteract those oscillations upon disengagement of the stabilizer bar to maintain the stability of the platform. In some embodiments, the stabilizing positions are used when there is no external support suitable for a stabilizer bar to contact.

According to the exemplary embodiment shown in FIGS. 6-9, the primary arm 104 and the secondary arm 106 manipulate at least one end effector (e.g., tool, implement, device, sensors or other manipulable objects) to complete a task. The available end effectors can be chosen based on the preferred task. In some embodiments, the task can be a welding operation. According to an exemplary embodiment, the end effectors for a welding operation can include but are not limited to a touch probe 108, a weld gun 110, a detachable lead 112, and a needle scaler 114. The end effectors can further include one or more cameras and microphones. In some embodiments, the end effectors are each coupled to a distal free end of each of the primary arm 104 and secondary arm 106 opposite the end coupled to the platform 102. The primary arm 104 and the secondary arm 106 can rotate a rotatable member such as a wrist joint (i.e., 104c, 106c, etc.) to select an end effector for use. In other embodiments, the end effectors can be stored on the robotic welding attachment 16 and the primary arm 104 and the secondary arm 106 can retrieve an end effector and detachably couple to it for operation.

According to the exemplary embodiment in FIGS. 6-9, the primary arm 104 positions and operates an end effector shown as a touch probe 108. Touch probe 108 can provide relevant position data for objects external to the robotic welding attachment 16. For example, the tough probe 108 can provide position data for a welding operation to the robotic welding attachment 16. The position data can include attributes of one or more work pieces in a welding operation. According to an exemplary embodiment, the attributes include a location of a surface of the work piece. The surface of the work piece can be indicated by three contact points. In some embodiments, the position data includes a weld start point and a weld end point. In some embodiments, the position data includes a desired attachment point for a ground lead and/or a voltage sensor, shown as detachable lead 112.

According to an exemplary embodiment, the touch probe 108 is positioned to capture the position data by a remote operator of the robotic welding attachment 16. For example, using the feed from the cameras 116 a remote operator can visually locate a desired weld and control the primary arm 104 to touch the touch probe 108 to the start and end points of the weld. In some embodiments, the touch probe 108 is positioned autonomously by the lift device 10. Still in other embodiments, the robotic welding attachment 16 can determine the relevant position data without the touch probe. For example, the robotic welding attachment 16 can include image recognition software to determine the position of a work piece, a desired weld location, and an/or an attachment point using the cameras 116. Still in other embodiments, any object detection and/or image detection methods can be used to obtain the position data.

According to the exemplary embodiment in FIGS. 6-9, the primary arm 104 can manipulate an end effector shown as a weld gun 110. The weld gun 110 can be part of any welding system, for example a Metal Inert Gas (MIG) welding system including a consumable electrode to join to pieces of metal together via an arc generated between the electrode, the work piece, and a ground. In some embodiments, the weld gun 110 is an applicator for other types of welding including Tungsten Inert Gas (TIG) welding, stick welding, or other welding systems. According to an exemplary embodiment, the primary arm 104 can position the weld gun 110 both in the proper coordinate position above a weld and at the proper angle and offset from a weld to perform the welding operation. According to an exemplary embodiment, the primary arm 104 can manipulate the weld gun 110 to follow weld paths such as the concave weave, the convex weave, curlicue weave, triangle weave, ladder weave, jagged ladder, or other weld paths.

According to the exemplary embodiment shown in FIGS. 6-9, the secondary arm 106 can manipulate an end effector such as a lead (e.g., wire, cable, etc.) shown as detachable lead 112. Detachable lead 112 can be selectively coupled to a work piece by at least one of the primary arm 104 or the secondary arm 106 via an attachment mechanism (e.g., electromagnet, switchable magnet, vacuum device, friction element, clip, clasp, or other removable attachment structures), shown as controllable magnet 122, which can be selectively operated in an active state and an inactive state. For example, during operation the secondary arm 106 can position the detachable lead 112 on a work piece and the controllable magnet 122 can be activated to hold the detachable lead in place. After the welding operation, the secondary arm 106 can couple to the detachable lead 112 and the controllable magnet 122 can be deactivated so it is no longer supported by the work piece. In some embodiments, the secondary arm 106 positions and holds the detachable lead 112 in contact with a work piece during the use of the detachable lead 112.

According to an exemplary embodiment, the detachable lead 112 can include one or more leads, shown as ground lead 124 to complete a welding circuit for the weld gun 110 and a voltage sensor lead 126 to monitor the welding circuit. In some embodiments, the ground lead 124 and the voltage sensor lead 126 are separately attached via individual detachable leads. Still in other embodiments, the detachable lead 112 includes both the ground lead 124 and the voltage sensor lead 126. According to an exemplary embodiment, the robotic welding attachment 16 places the detachable lead 112 according to a position indicated by the touch probe 108. For example, an operator controlling the lift device 10 can control touch probe 108 to contact a point on the work piece designated as an attachment point for the detachable lead 112. The ground lead 124 and voltage sensor lead 126 are part of a welding circuit, which can also include the weld gun 110.

According to the exemplary embodiment shown in FIGS. 6-9, the robotic welding attachment 16 includes environmental sensors (e.g., temperature sensors, humidity sensors, atmospheric pressure sensors, wind speed sensors, vibration sensors microphones, etc.) shown as sensor system 800. Sensor system 800 measures the environment and working conditions around the robotic welding attachment 16, which when at outdoors and/or at height can be substantially different than the environment experienced by a remote operator. The data collected by the sensor system 800 can be used to tune one or more weld parameters based on the environment around the robotic welding attachment 16. For example, weld parameters for a weld performed outside can vary substantially from weld parameters for a weld performed inside. The weld parameters can include but are not limited to the amperage of the weld system, the appropriate wire size, the voltage, the wire feed speed, the weld path, etc. In some embodiments, the data collected by the sensor system 800 is provided to a remote operator who thereafter manually adjust the weld parameters. In some embodiments, the data is sent to a controller (e.g., attachment controller 1220) which thereafter automatically adjusts the weld parameters based on the data. For example, the attachment controller 1220 can include a look up table correlating environmental conditions to weld parameter values. In some embodiments, the attachment controller 1220 can use machine learning to determine appropriate weld parameters based on the data from the sensor system 800. It should be understood that the attachment controller 1220 can use any form of decision making process to calculate the appropriate weld parameters based on the data from the sensor system 800.

According to an exemplary embodiment, the robotic welding attachment 16 includes a manual welding system. The manual welding system can be attached to the primary arm 104 or the secondary arm 106 and used to quickly perform a weld without the need to adjust and calibrate weld gun 110. For example, an operator can manually adjust the weld parameters of the manual welding system to the appropriate values and then control the movement of the lift apparatus 14 to position the robotic welding attachment 16 in front of a weld, at which point the operator can control the robotic arm coupled to the manual welding system to complete a weld. In some embodiments, the manual welding system is used to verify the appropriate weld parameters to which the weld gun 110 should be set to. For example, the manual welding apparatus can be used to perform a test weld according to a first set of welding parameters, and the results of the test weld can be used to validate and/or update the first set of welding parameters to create a second set of welding parameters for the robotic welding attachment 16 to operate according to.

In some embodiments, the sensor system 800 also includes task-related sensors. For example, for performing a weld operation sensor system 800 can include sensors to measure the work piece (i.e., parent material) temperature, work piece thickness, the distance to the weld from the one or more points on the robotic welding attachment 16, the consumable electrode temperature, the volume of inert gas remaining, etc. The task-specific parameters can also be used to adjust the weld parameters.

According to the exemplary embodiment shown in FIGS. 6-9, the primary arm 104 and the secondary arm 106 support one or more cameras, shown as primary arm wrist camera 118 and secondary arm wrist camera 120. In some embodiments, the platform 102 also supports a plurality of cameras 116. The image data form the cameras 116, the primary arm wrist camera 118, and secondary arm wrist camera 120, can be used by a remote operator to control the operation of the robotic welding attachment 16. For example, a remote operator can view the image data from secondary arm wrist camera 120 to inform remote control over the position of primary arm 104. In some embodiments, the primary arm 104 and the secondary arm 106 are manipulated to provide an improved vantage point to an operator. In some embodiments, the position of the robotic welding attachment 16 itself is adjusted (e.g., by at least one of the lift apparatus 14, the mechanical coupling 150, etc.) to improve the vantage point of cameras 116.

Stabilizer

Figure 10:
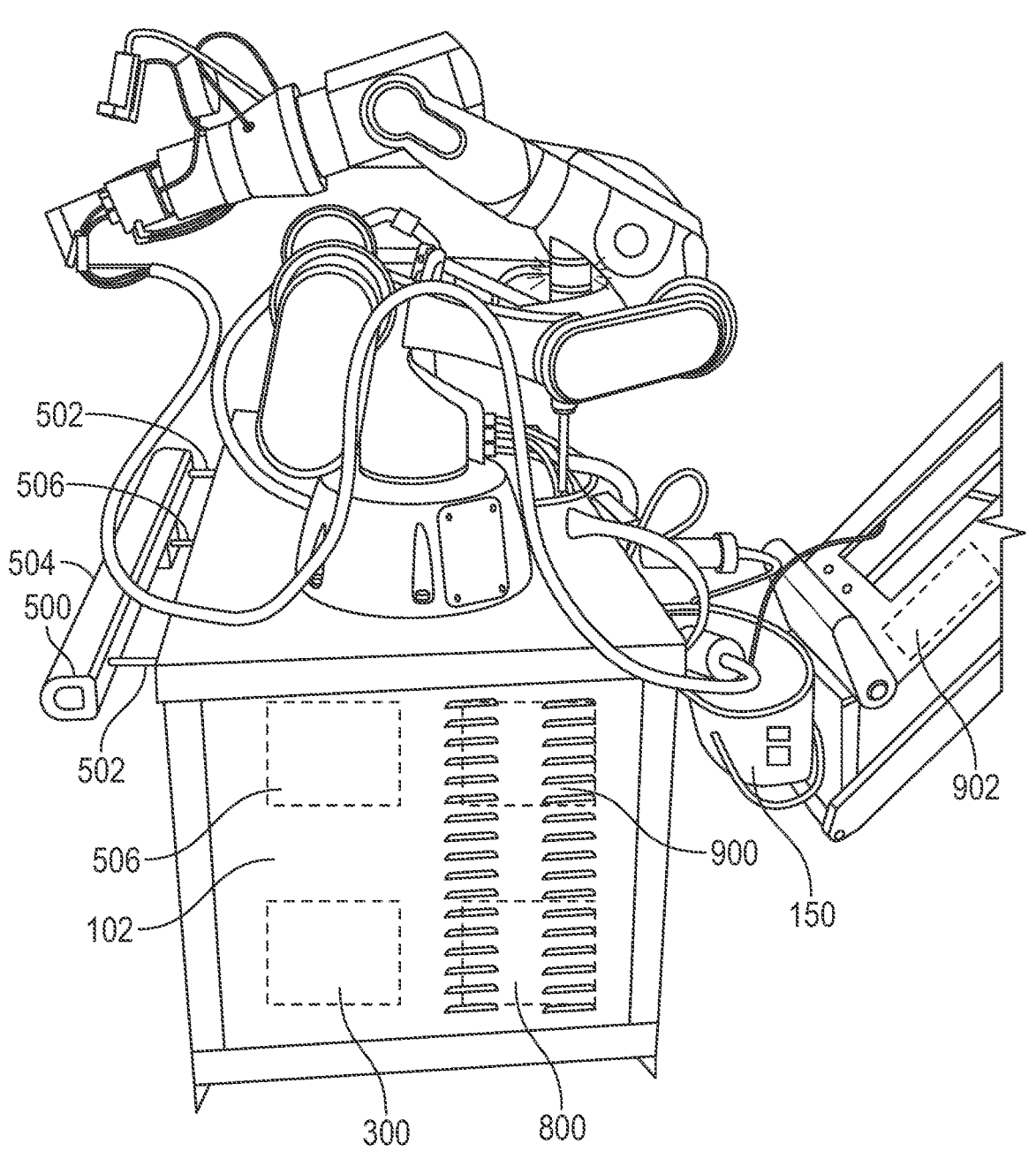
FIG. 10 is a side perspective view of a robotic welding attachment with a stabilizer, according to an exemplary embodiment.
Figure 11:
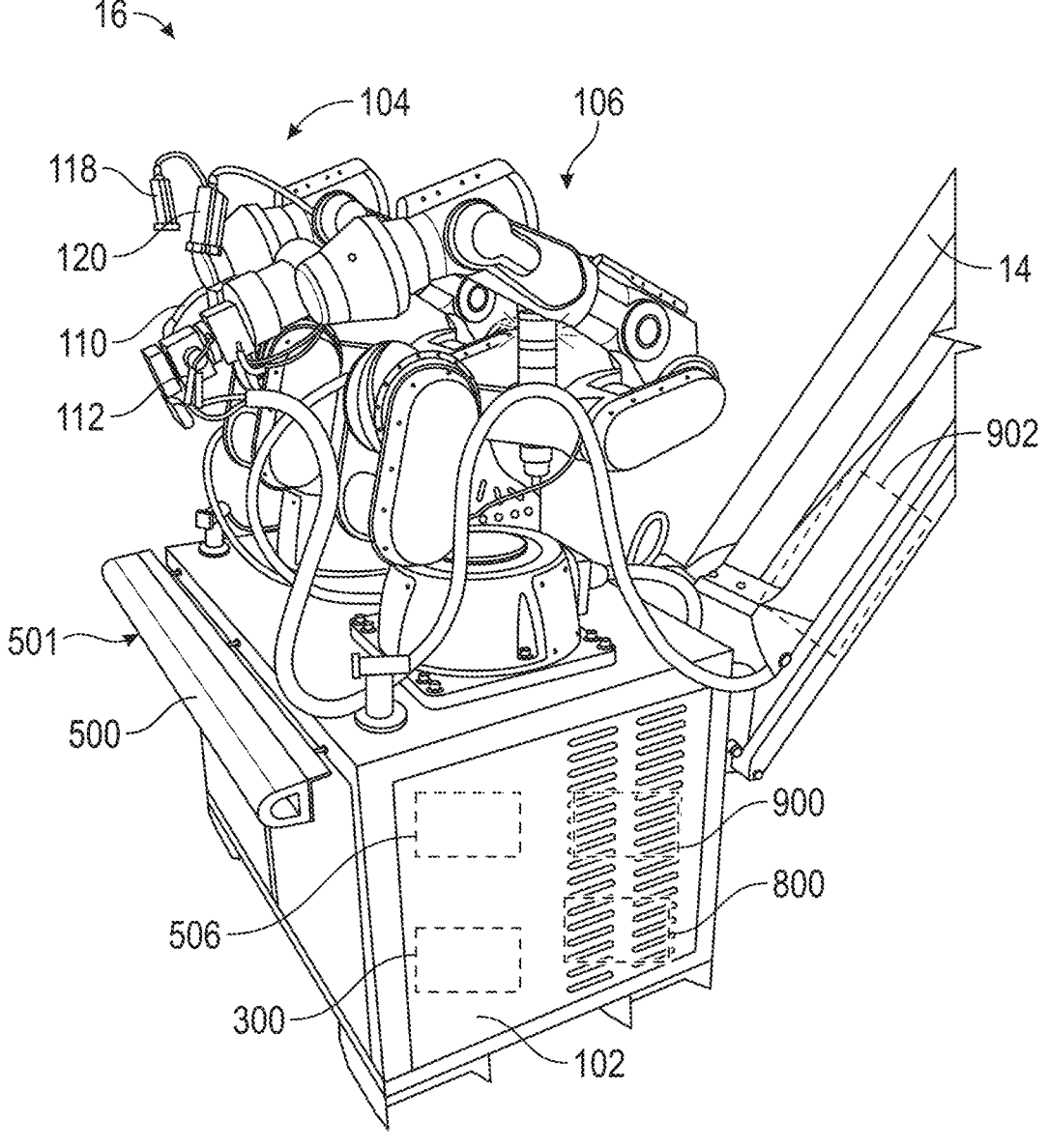
FIG. 11 is another side perspective view of a robotic welding attachment with a stabilizer, according to an exemplary embodiment.

As shown in FIGS. 10-11, platform 102 includes a stabilizer (e.g., support element, grapple, hook etc.), shown as stabilizer bar 500. The stabilizer bar 500 is positioned along a front face of platform 102 facing opposite from mechanical coupling 150. The stabilizer bar 500 is selectively extendable from platform 102 in a direction perpendicular to a front of the platform 102 to contact an external support. The stabilizer bar 500 is extended and retracted by one or more actuators (e.g., electric, pneumatic, hydraulic, etc.), shown as stabilizer bar actuators 502. In some embodiments, a single stabilizer bar actuator 502 can be used. In some embodiments, the stabilizer is a hook. For example, when performing a welding operation on rebar, the stabilizer can hook onto a rebar structure to provide support to the robotic welding attachment 16.

According to an exemplary embodiment, the stabilizer bar 500 is moveable between a first position defined by a first distance between a stabilizer bar front 504 and the lift apparatus 14, and a second position defined by a second distance between the stabilizer bar front 504 and the lift apparatus 14, the second position larger than the first. In some embodiments, the first and second distances can also be measured between the stabilizer bar front 504 and at least one of the mechanical coupling 150, or the platform 102. During operation, the stabilizer bar 500 can be actuated from the first position to the second position to contact an external support. The contact between the stabilizer bar 500 and the external support, in addition to the support provided by the lift apparatus, stabilizes the platform 102 by providing an additional point of contact and force in addition to that provided by the lift apparatus 14. In some embodiments, the stabilizer bar 500 includes a bumper shown as bumper 501 positioned at the stabilizer bar front 504. In some embodiments, bumper 501 is configured to cushion an impact between the stabilizer bar 500 and the external support. In some embodiments, the stabilizer bar is made of a flexible material, for example plastic, rubber, silicone, or polyurethane. In some embodiments, the bumper 501 is made of a high friction material such as a rubber or a metal. In some embodiments, the surface of the bumper 501 is textured to increase the sliding friction between the bumper 501 and the external support. In some embodiments, the bumper 501 can be substantially mostly hollow. The bumper 501 can be a single, unitary piece, or be made of multiple individual pieces. In some embodiments, the bumper 501 only covers a portion of the stabilizer bar front 504.

According to an exemplary embodiment, the force exerted by the stabilizer bar 500 onto the external support and against the robotic welding attachment 16, is limited to a maximum force. In some embodiments, the maximum force can be the force at which the lift apparatus 14 can no longer maintain the position of the robotic welding attachment 16. For example, the maximum force can be 50 lbs. Still in other embodiments, the maximum force can be 90 lbs. If, during use, the force exerted onto the lift apparatus 14 exceeds the maximum force, the distance between the stabilizer bar front 504 and the platform 102 is adjusted (e.g., shortened) by the stabilizer bar actuator 502 to adjust the position of the robotic welding attachment 16 and lower the force the stabilizer bar 500 exerts on the robotic welding attachment 16.

According to an exemplary embodiment, the position of the stabilizer bar 500 relative to the platform 102 can be locked by one or more mechanisms, shown as locking mechanism 506. The locking mechanism 506 can be mechanical such that the force exerted on the stabilizer bar 500 from the external support and passed to the platform 102 is substantially born (i.e., +/−10%) by the locking mechanism 506 and not by the stabilizer bar actuators 502. The position lock of stabilizer bar 500 can thereafter increase the stability by locking the position to remove compliance associated with the stabilizer bar actuators 502. For example, under pressure the stabilizer bar actuators 502 can undergo a minor amount of unintended movement (i.e., compliance) due to compression and/or expansion of a fluid inside the actuator. Locking mechanism 506 can remove the stabilizer bar actuators 502 from the path of the force between the external support and the robotic welding attachment 16, thereby stiffening the position of the stabilizer bar 500 and improving the stability of platform 102. In some embodiments, the stabilizer bar 500 can be locked in either of the first position and the second position via the locking mechanism 506. In some embodiments, the locking mechanism 506 can lock the stabilizer bar 500 in any number of positions between and including the first position and the second position. In some embodiments, the locking mechanism can include any type of mechanical locking system, for example an automated pin lock.

According to an exemplary embodiment, the stabilizer bar front 504 can electrically couple the external support to one or more components of the robotic welding attachment 16. For example, the stabilizer bar 500 can act as ground lead 124 and complete a welding circuit for weld gun 110.

According to the exemplary embodiment of FIGS. 10-11, the platform 102 contains an internal stabilizer (e.g., gyroscope, flywheel, moveable, etc.) shown as internal stabilizer 900. Internal stabilizer 900 can stabilize platform 102 at height without the need for an external support. While shown in platform 102, in some embodiments internal stabilizer can be positioned at or near a distal end of lift apparatus 14, such as position 902. In some embodiments, internal stabilizer 900 stabilizes the platform 102 by increasing its inertia. For example. the internal stabilizer 900 can be a gyroscope, a flywheel, etc., which increases the inertial mass of the robotic welding attachment 16 to aid it in resisting unwanted motion.

According to an exemplary embodiment, the internal stabilizer 900 is an active stabilization system that responds to and/or counteracts unwanted changes in the position of the robotic welding attachment 16. For example, the internal stabilizer 900 can be a moveable mass (e.g., linearly moveable mass, fluid mass, reaction wheel, etc.) that responds to changes in position of the robotic welding attachment 16 by moving (e.g., translating, pumping, spinning) etc. mass within the robotic welding attachment 16.

According to an exemplary embodiment, lift apparatus 14 is a high-speed side swing jib capable of stabilizing the robotic welding attachment 16. For example, the lift apparatus 14 can control one or more linear actuators (e.g., linear electric actuator 52, linear electric actuator 54, linear electric actuator 30, and linear electric actuator 38) to actively stabilize the robotic welding attachment 16.

According to an exemplary embodiment, internal stabilizer 900 can actively react to changes in positions of the platform 102 indicated by one or more position keeping systems. In some embodiments, the position keeping system uses the image data from cameras on the platform 102 (e.g., primary arm wrist camera 118, cameras 116) to visually observe a target, and to detect changes in the position of the platform 102 based on the position of the target in the image data. For example, the internal stabilizer 900 can observe a work piece and use the work piece as a target, working to maintain the image of the work piece to be as consistent as possible.

According to an exemplary embodiment, the internal stabilizer 900 includes an inertial measurement unit (IMU) to detect changes in the position of the platform 102. The internal stabilizer 900 then compensates for changes detected by the IMU via the one or more stabilization methods discussed herein (e.g., flywheel, moveable mass, etc.). In some embodiments, an IMU is included to detect changes in the position of the platform 102 in addition to using image detect software to detect changes in the position of the platform 102 via its relationship to a target.

According to an exemplary embodiment, the lift apparatus 14 can stabilize the platform by modifying its envelope control system to prioritize stiffness. The working envelope of the lift apparatus 14 defines the area which is accessible by the lift device. A specific point in the working envelope can be reached by the lift apparatus 14 in various positions. The envelope control system can determine how to position the lift apparatus 14 to reach a desired point in the envelope according to one or more preferences (e.g., capacity, moment force, extension length, etc.). According to an exemplary embodiment, the lift apparatus 14 can prioritize stiffness. The lift apparatus 14 can thereafter position itself in the position with the greatest stiffness, for example, even if this reduces the capacity of the lift apparatus 14.

Figure 12:
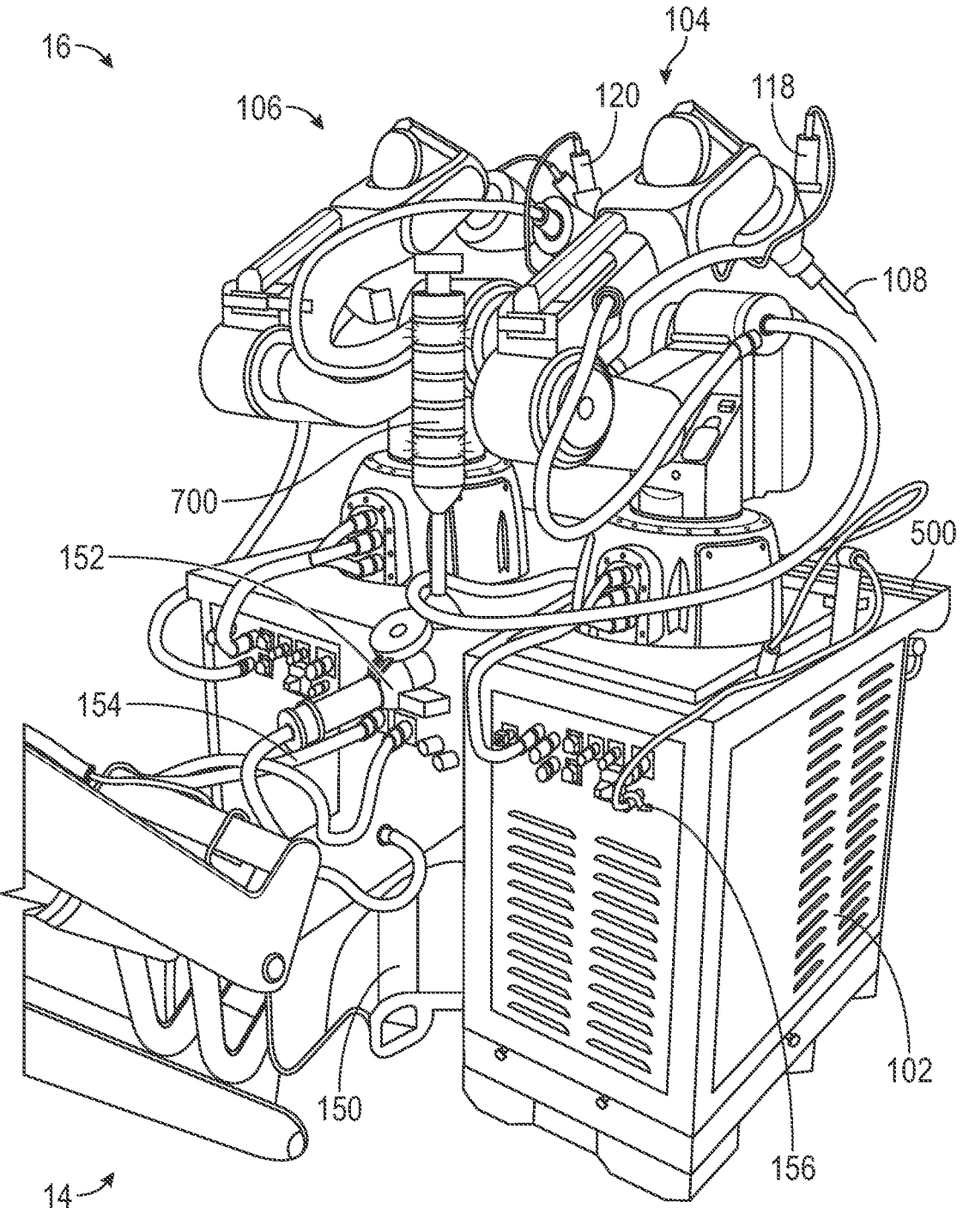
FIG. 12 is a perspective view of a robotic welding attachment with an indicator, according to an exemplary embodiment.

According to the exemplary embodiment show in FIG. 12, the robotic welding attachment 16 includes an indicator (e.g., visual indicator, audible indicator, etc.) shown as light 700. In some embodiments, light 700 includes one or more sections, shown as sections 701a and 701b. Each section can incl one or more individually controllable lights. Light 700 can display one or more visual indicators associated with a status of the robotic welding attachment 16 to inform those around it of its status using the one or more individually controllable lights. For example, before beginning a welding operation, the light 700 can strobe. In some embodiments, the light 700 also includes one or more speakers for generating an audible alert in addition to or in the alternative to a visual alert.

Control System

Figure 13:
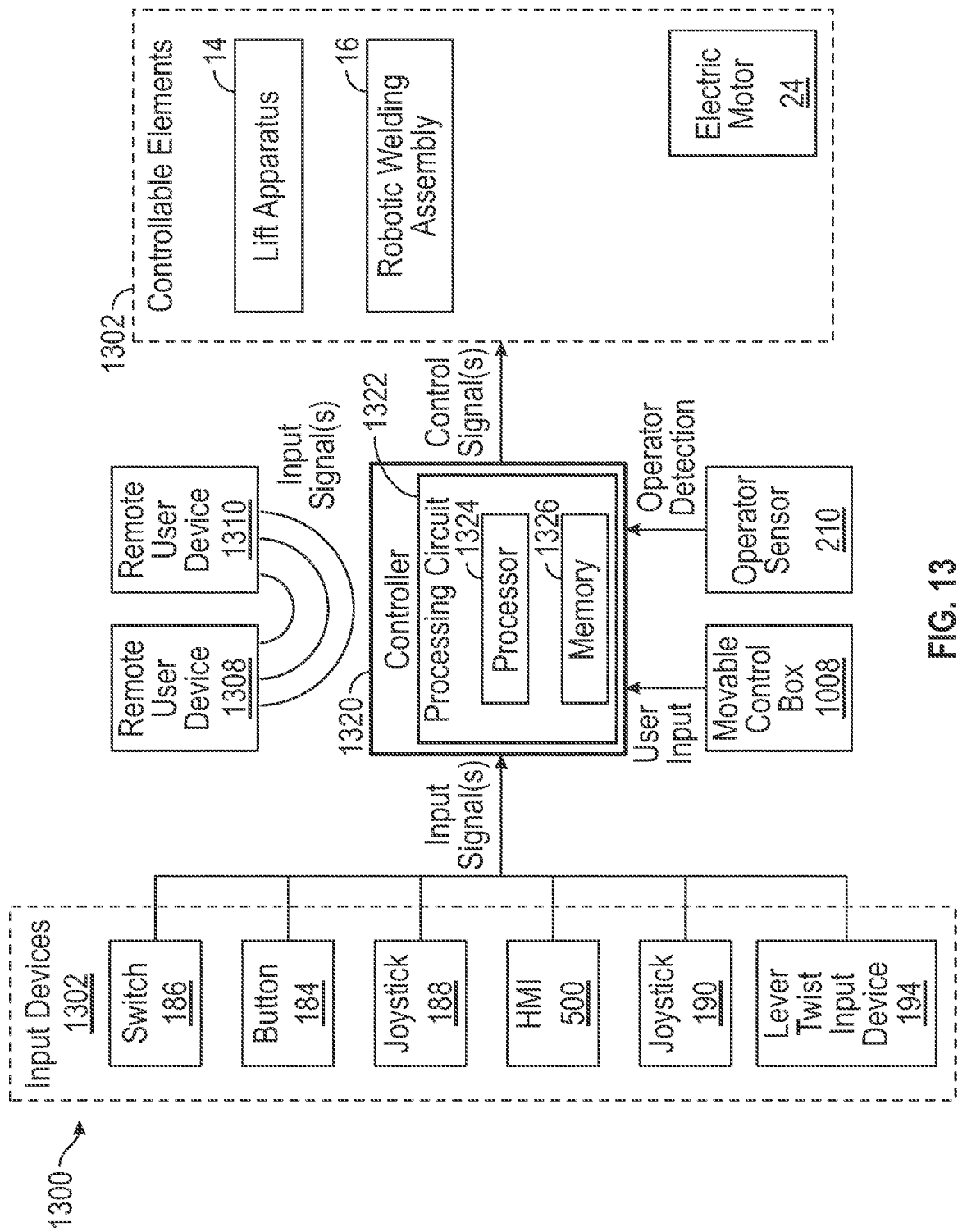
FIG. 13 is a schematic diagram of a control system of the lift device of FIG. 1, according to an exemplary embodiment.

According to the exemplary embodiment in FIG. 13, a control system 1300 for lift device 10 includes controller 1320, input devices 1302, and controllable elements 1304. In some embodiments, input devices 1302 includes, but is not limited to, switch 186, button 184, joystick 188, HMI 600, joystick 190, and lever twist input device 194. Likewise, controllable elements 1304 can include, but are not limited to, lift apparatus 14 and robotic welding attachment 16. Controllable elements 1304 can also include the base assembly 12, including electric motor 24. Controller 1320 is configured to receive various input signals from the input devices 1302 and generate control signals for any of the controllable elements 1304 of lift device 10.

In some embodiments, controller 1320 is wirelessly communicably coupled with a remote user device 208. Controller 1320 can receive a user input or a request to deploy deployable operator station 100 from the remote user device 1308. In response to receiving the user input, controller 1320 can generate control signals for the various controllable elements 1304 to deploy deployable operator station 100. Advantageously, remote user device 208 and controller 1320 can facilitate initiating deployment of robotic welding attachment 16 before the user or operator is at lift device 10 (e.g., is a distance away from lift device 10).

The controller 1320 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 5, the controller 1320 includes a processing circuit 1322 and a memory 1326. The processing circuit 1322 may include an ASIC, one or more FPGAs, a DSP, circuits containing one or more processing components, circuitry for supporting a microprocessor, a group of processing components, or other suitable electronic processing components. In some embodiments, the processing circuit 1322 is configured to execute computer code stored in the memory 1326 to facilitate the activities described herein. The memory 1326 may be any volatile or non-volatile computer-readable storage medium capable of storing data or computer code relating to the activities described herein. According to an exemplary embodiment, the memory 1326 includes computer code modules (e.g., executable code, object code, source code, script code, machine code, etc.) configured for execution by the processing circuit 1322. In some embodiments, the controller 1320 may represent a collection of processing devices (e.g., servers, data centers, etc.). In such cases, the processing circuit 1322 represents the collective processors of the devices, and the memory 1326 represents the collective storage devices of the devices.

In some embodiments, controller 1320 is positioned on the lift device 10. For example, referring to FIG. 2, the controller 1320 can be positioned at position 200 on base assembly 12. In some embodiments, the controller 1320 is positioned on the robotic welding attachment 16. For example, referring now to FIG. 5, the controller 1320 is positioned within the platform 102 at position 300. In some embodiments, the controller 1320 is positioned remotely from the lift device 10 and sends the control signals to the controllable elements 1304 wirelessly. For example, the controller 1320 can be positioned in a separate device onsite, in a remote computing device offsite, or in a cloud computing system. In some embodiments, the controller 1320 and/or the operations its perform is divided amongst the various controller positions described herein. When divided, each position can include a controller including a processing circuit, a processor, and memory as shown in FIG. 13. For example, controller 1320 can be divided between the lift apparatus 14 and the robotic welding attachment 16. Input signals from remote user device 1308 can direct a portion of the control system 1300 at position 200 to control the movement of the lift apparatus 14, and input signals from the remote user device 1310 can direct a portion of the control system 1300 at position 300 to control the operation of the robotic welding attachment 16 and its subcomponents (e.g., primary arm 104, secondary arm 106, etc.).

According to an exemplary embodiment, the control system 1300 can include a warning system. The warning system monitors the positions of the primary arm 104 and the secondary arm 106 to identify when a control command may possibly cause a collision or move the robotic welding attachment 16 in an unsafe manner. In some embodiments, the collision is between the primary arm 104 and the secondary arm 106. In some embodiments, the collision is between at least one of the primary arm 104 and the secondary arm 106 and another member, for example, the platform 102, the lift apparatus, 14, etc. According to an exemplary embodiment, the control system 1300 provides an alert to an operator (i.e., via the remote user device 1308) when a command is likely to cause a collision. In some embodiments, the warning system tracks the position of the primary arm 104 and the secondary arm 106 and determines if they are in safe position for the lift apparatus to move the robotic welding attachment 16. In some embodiments, the control system 1300 provides an alert to an operator when a command requires moving the robotic welding attachment 16 when one of the arms is in an unsafe position. For example, when the arms are extended, the warning system could provide an alert to an operator commanding the lift apparatus to lower the robotic welding attachment 16. In some embodiments, the control system 1300 operates as a fail safe and limits control of the robotic welding attachment 16 and/or the lift apparatus 14 when an unsafe command is received.

Figure 14:
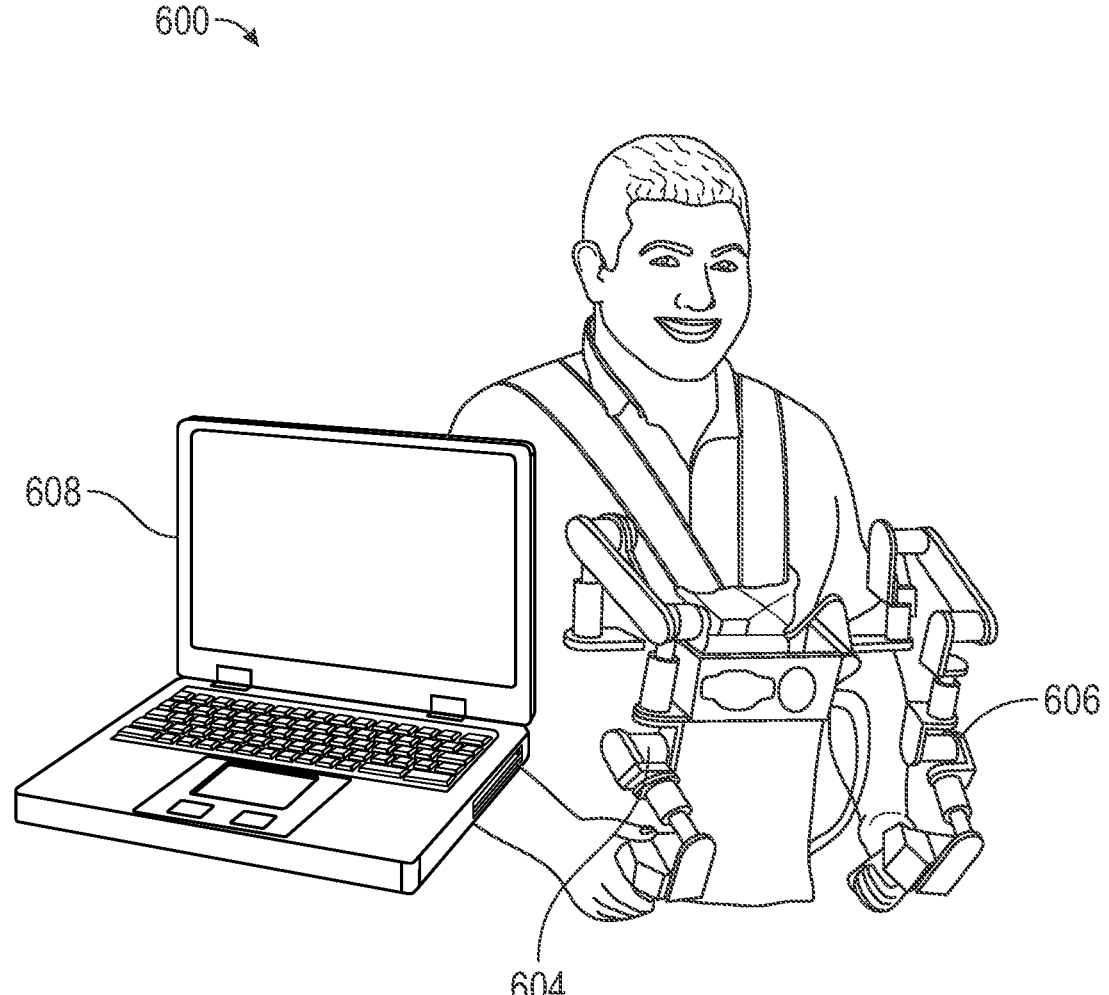
FIG. 14 is a graphical representation of a human machine interface for use in the control system of FIG. 13, according to an exemplary embodiment.

According to the exemplary embodiment shown in FIG. 14, the HMI 600 includes a pair of movable appendages, shown as primary appendage 604 and secondary appendage 606, which can translate their own movement as caused by an operator into commands for controlling one or more parts of the robotic welding attachment 16. For example, the appendage 604 can provide instructions for the movement of the primary arm 104 and the secondary appendage 606 can provide instructions for the movement of the secondary arm 106. In some embodiments, the HMI 600 also includes a base station, shown as base station 608, which can be used to provide additional control the lift device 10. The base station 608 can include a display and one or more user inputs. In some embodiments, the display is a touch-screen display.

Figure 15:
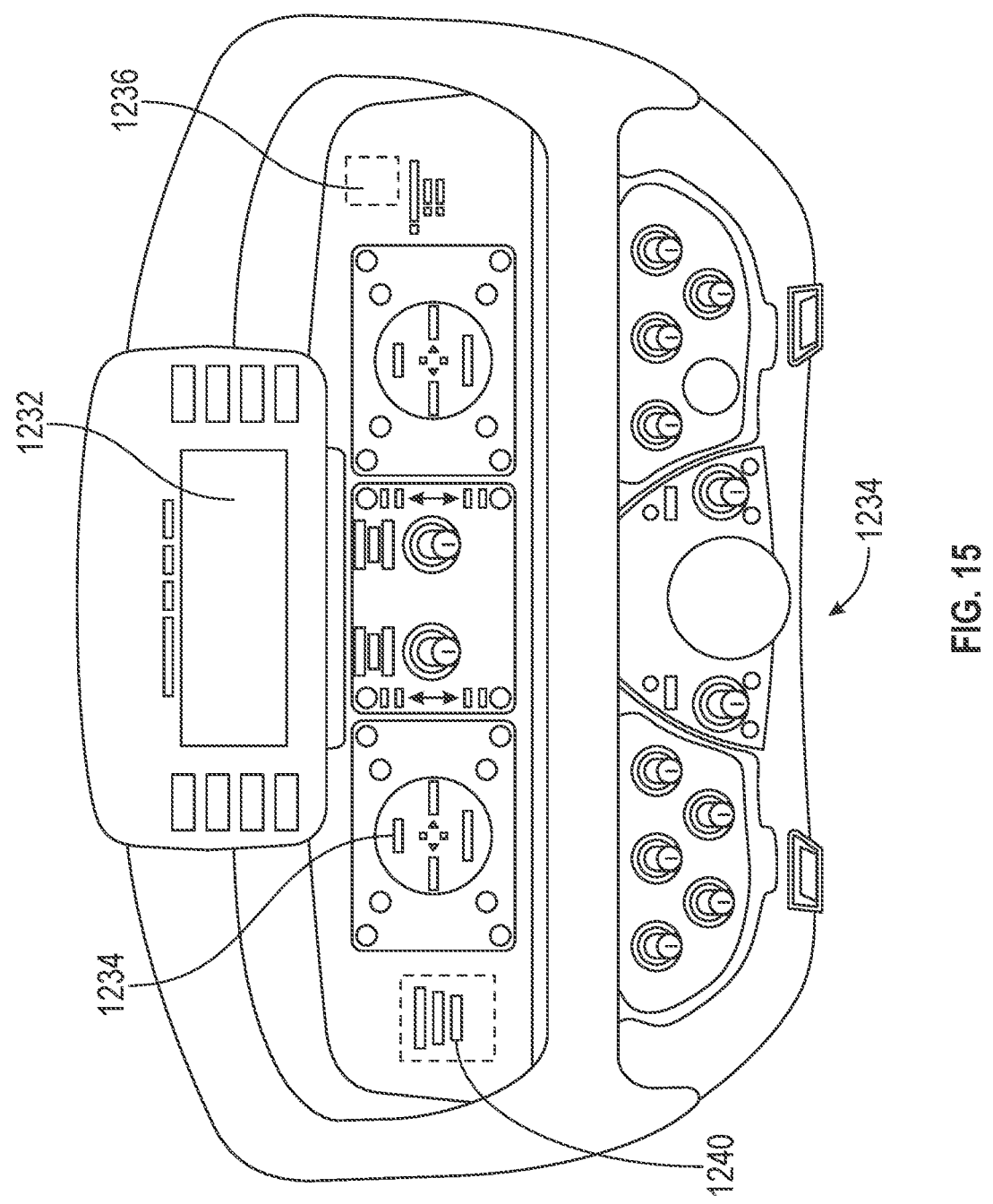
FIG. 15 is a graphical representation of a remote user device for use in the control system of FIG. 13, according to an exemplary embodiment.

According to the exemplary embodiment shown in FIG. 15, the remote user device 1308 includes a display, shown as display 1332. The remote user device 1308 can control the lift apparatus 14. For example, the remote user device 1308 can control the position of the lift apparatus 14 to raise and lower the robotic welding attachment 16 to a work piece. According to an exemplary embodiment, the remote user device 1308 includes a set of user inputs (e.g., analog switches, digital switches, joysticks, levers, touch controls, push-buttons, touch buttons, levers, joysticks, etc.) shown as buttons user inputs 1334. An operator can control the lift apparatus 14 using the user inputs 1334 and the display 1332.

According to an exemplary embodiment, the remote user device 1308 can additionally control the robotic welding attachment 16. In some embodiments, the remote user device 1308 controls the positioning and movement of the primary arm 104 and the secondary arm 106 without the need for HMI 600. For example, user inputs 1334 can include one or more joysticks for controlling the movement of the primary arm 104 and the secondary arm 106. In some embodiments, the user inputs 1334 include an emergency stop. The emergency stop can shut down the lift apparatus 14 and/or the robotic welding attachment 16. In some embodiments, the user inputs 1334 include an enable feature to cancel, rescind, etc. an emergency stop. In some embodiments, the user inputs 1334 can be used to input and/or adjust one or more weld parameters remotely by a user.

According to an exemplary embodiment, the display 1332 can display data associated with the robotic welding attachment 16 and a welding operation. The display 1332 can display weld parameter settings, sensor values relates to primary arm 104 and/or secondary arm 106, lift apparatus information, platform 102 stabilization control information, etc. In some embodiments, the display 1332 shows the image data from a camera in the robotic welding attachment 16.

According to an exemplary embodiment, the remote user device 1308 includes an audible output, shown as speaker 1336. The speaker 1336 can provide an operator with audio captured may one or more microphones included in the robotic welding attachment 16. The microphones can be used to record and transmit the sounds associated with a weld operation. For example, during a weld operation an operator via the speaker 1336 on remote user device 1308 can listen to a weld operation in progress, and use that feedback to inform decisions such as if the weld parameters are correct, if the weld was successful, the strength of the weld, etc.

According to an exemplary embodiment, the remote user device 1308 includes an activity detector, shown as activity detector 1340. In some embodiments, the remote user device 1308 includes a failsafe which when triggered automatically deactivates the lift device 10. The triggers can be inactivity limits, general time limits, capacity limits, environmental limits (e.g., as measured by sensor system 800), etc. According to an exemplary embodiment, the trigger is a time limit associated with the last time a joystick of user inputs 1334 was moved. The inactivity timer can be reset each time the user input 1334 is used. After the timer reaches a certain threshold, it can automatically deactivate the lift device 10 or otherwise put it in a safe position. According to an exemplary embodiment, the activity detector 1340 can include a motion detector (e.g., an IMU, an accelerometer, etc.), which detects when the remote user device 1308 is in motion. According to an exemplary embodiment, the remote user device 1308 can use the motion detector to reset the inactivity timer each time the activity detector 1340 detects movement. For example, the inactivity timer can be a time from when a user input 1334 was last pressed, as an approximation of operator presence and awareness. The inactivity timer can be reset each time the remote user device 1308 is moved, as this is indicative of the remote user device 1308 being carried by an operator, and therefore indicates that the operate is present and aware. Accordingly, to avoid the remote user device 1308 activating the failsafe mode even when the operator is present, the remote user device 1308 can reset the inactivity timer based on movement of the remote user device 1308 in addition and/or alternatively to the use of the user inputs 1334.

Figure 16:
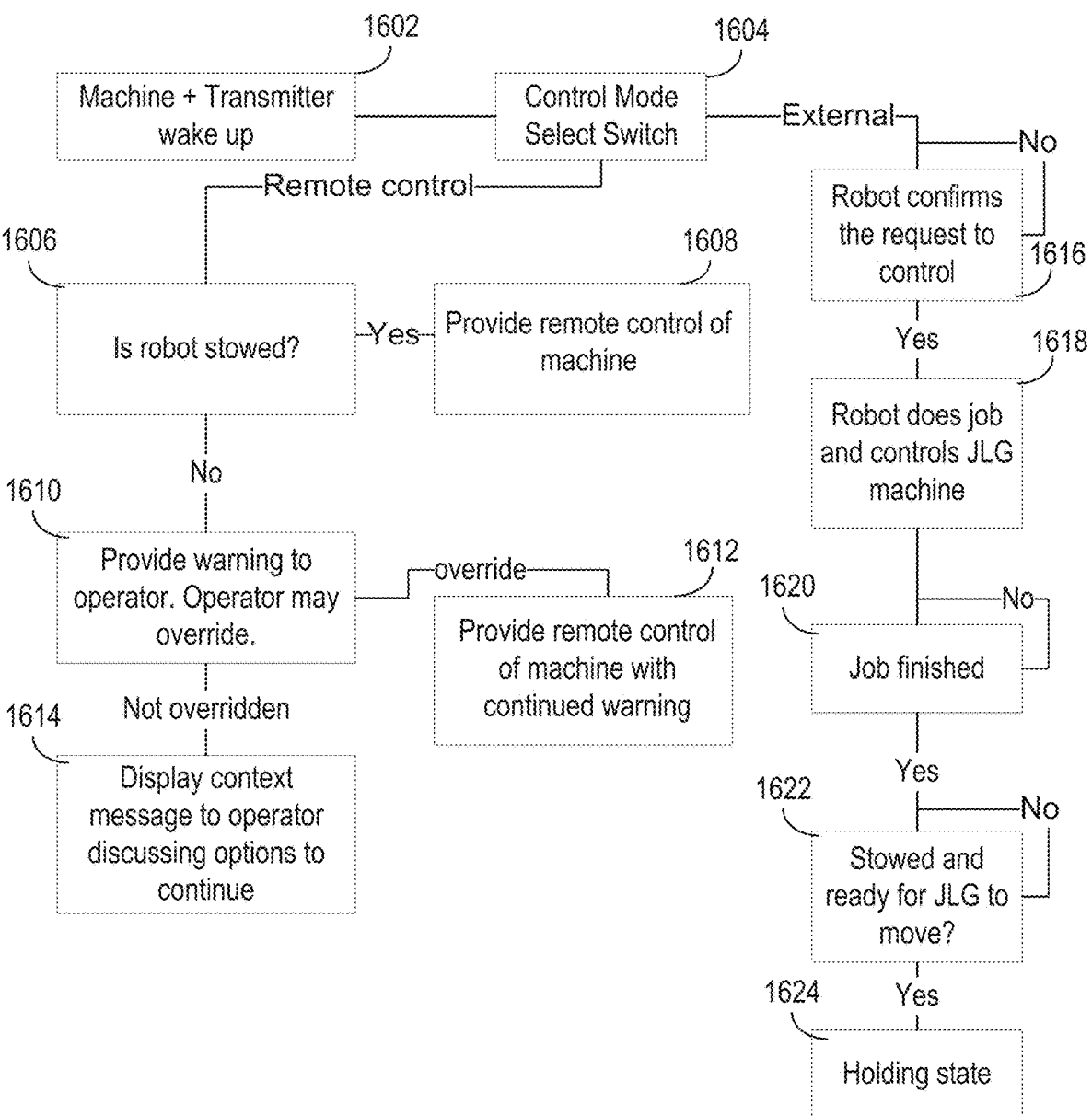
FIG. 16 is a flow diagram of a process for passing control between a remote user device and a control system, according to an exemplary embodiment.

Referring now to FIG. 16, a process 1600 for handing off control between the remote user device 1308 and the control system 1300 is shown, according to an exemplary embodiment. Process 1600 protects the robotic welding attachment 16 from damage by ensuring the primary arm 104 and the secondary arm 106 are positioned to be moved before providing remote control to an operator. In some embodiments, process 1600 is performed by one or more components of the lift device 10. For example, process 1600 can be performed by control system 1300.

In some embodiments, process 1600 includes the lift device 10 and the remote user device 208 waking up (step 1602). In some embodiments, process 1600 includes determining the position of a control mode selector switch (step 1604). The control mode selector switch can be included one of the user inputs 1334 on the remote user device 1308. The control mode selector switch may be in a remote control position or an external position. In some embodiments, in the remote control position, the lift device 10 is controlled by the remote user device 1308. In some embodiments, in the external position the remote user device 1308 is locked out of control, and the robotic welding attachment 16 is controlled autonomously by the control system 1300.

In some embodiments, process 1600 includes determining if the robotic welding attachment 16 is in the stowed position (step 1606). In some embodiments, if the robotic welding attachment 16 is in the stowed position the process 1600 proceeds to provide remote control of the lift device 10 to an operator (step 1608). In some embodiments, if the robotic welding attachment 16 is not stowed, the process 1600 proceeds to providing an override-able warning to the operator (step 1610). The warning can be provided to the operator via the remote user device 208. In some embodiments, the warning can be provided via the light 700.

In some embodiments, process 1600 includes the operator selecting to override the override-able warning, at which point process 1600 proceeds to provide remote control of the lift device 10 to the operator (step 1612). In some embodiments, process 1600 includes the operator selecting not to override the override-able warning, at which point process 1600 proceeds to display a message to the operator discussing further options (step 1614). In some embodiments, the message is displayed to an operator via the display 1332. The message can include options to reposition the primary arm 104 and the secondary arm 106 into a stow position, pass control to the HMI 600 to reposition the arms, etc.

In some embodiments, at step 1604 if the control mode selector switch is in the external position, the user remote device 1308 passes control of the lift device 10 and/or just the robotic welding attachment 16 to the control system 1300.

In some embodiments, the control system 1300 confirms that it should assume control over the lift device 10 (step 1616). If yes, the process 1600 proceeds to step 1618, during which the control system 1300 performs a directed task. According to an exemplary embodiment, the directed task is a welding operation. In some embodiments, the task is a welding operation as described in process 1800. In some embodiments, the control system 1300 checks if the task for the robotic welding attachment 16 is complete (step 1620). In some embodiments, if the task is complete, the control system 1300 checks if the primary arm 104 and the secondary arm 106 are in the stow position and ready for movement (step 1622). In some embodiments, after the primary arm 104 and the secondary arm 106 are stowed, the control system 1300 places the lift device 10 in a holding state (step 1624). In the holding state, the lift device 10 is stationary and waiting for the control mode select switch to transition make to the remote control position.

According to an exemplary embodiment, when the control mode select switch is in the external position, control is passed additionally and/or alternatively to the HMI 600. For example, when the control mode select switch is in the external position, the HMI 600 can operate the primary arm 104 to position the touch probe 108 to learn the surface of a work piece and weld start points, end points, and lead attachment points, at which point the control system 1300 can assume control to perform the welding operation.

Welding Process

Referring now to FIG. 17, a process 1700 for performing a weld at height is shown, according to an exemplary embodiment. In some embodiments, the process 1700 is performed by one or more components of the lift device 10.

In some embodiments, process 1700 includes moving the control selector switch to the remote control position to give the remote user device control (step 1702). The remote user device can be remote user device 1308.

In some embodiments, process 1700 includes positioning a robotic welding attachment in the area to be welded (1704). In some embodiments, the robotic welding attachment is the robotic welding attachment 16. In some embodiments, the robotic welding attachment is positioned using the lift apparatus 14.

In some embodiments, process 1700 includes deploying a stabilization bar (step 1706). In some embodiments, the stabilization bar can be the stabilization bar 500 of lift device 10. The stabilization bar can selectively extend from a front of the robotic welding attachment to contact an external support via stabilizing bar bumper 501. Upon contact, the robotic welding attachment is now supported by both the external support via the stabilization bar 500 and the lift apparatus 14. In some embodiments, the stabilization bar is force-limited, such that it only exerts a maximum amount of force on lift apparatus 14. For example, the force limit can be 50 lbs., such that the stabilization bar can selectively extend and/or retract to ensure the force on the lift apparatus 14 (via the robotic welding attachment 16) is at or below 50 lbs.

According to an exemplary embodiment, the stabilizer bar can be mechanically locked in position. By locking the stabilizer bar in position mechanically, the force exerted on the stabilizer bar between the external support and the robotic welding attachment is no longer born by one or more actuators for moving the stabilizer bar. Instead, the force is borne by the mechanical lock, which is far stiffer than an actuator, which can include a compressible fluid.

Still in other embodiments, step 1706 can additionally and/or alternatively stabilize the robotic welding attachment in other ways described herein (e.g., using the secondary arm to grasp a work piece or support structure, using movement of one of the arms to counter act movement of the other, using an internal stabilizer such as internal stabilizer 900, etc.).

In some embodiments, the control mode selector switch is moved to an external position to pass control over the lift device 10 to the an external input device and/or the lift device control system (step 1708). In some embodiments, the external input device is the HMI 600. In some embodiments, the lift device control system is the same or similar to the control system 1300.

In some embodiments, the robotic welding attachment learns a work surface (step 1710). In some embodiments, the robotic welding attachment learns the work surface using a touch probe, such as touch probe 108. For example, an operator via HMI 600 can control the primary arm 104 to use the touch probe 108 to learn the position and orientation of the work surface in three-dimensional space. In some embodiments, "learning" the work surface includes identifying the top plane of the work surface. In some embodiments, the robotic welding attachment learns the work surface via the touch probe 108 by the touch probe 108 contacting the work surface at three separate points. In some embodiments, the robotic welding attachment learns the work surface using other detection systems such as image detection software and one or more cameras.

In some embodiments, the robotic welding attachment learns a lead attachment position (step 1712). The lead attachment position is the position where one or more detachable leads are place on the work piece. In some embodiments, the lead attachment positioned is learned by using the touch probe 108. The primary arm 104 can manipulate the touch probe 108 to touch a location on the work piece marked as the lead attachment position. The location can be marked by a remote operator of the robotic welding attachment 16. In some embodiments, the lead attachment position acts as one of the three points needed for the robotic welding attachment to learn a surface. Still, in other embodiments, the robotic welding attachment can learn the lead attachment position using other detection systems such as image detection software and one or more cameras.

In some embodiments, the robotic welding attachment learns the weld start and end points (step 1714). The weld start and end points are points on a surface of the work piece at which the weld should start and end. In some embodiments, the robotic welding attachment learns the weld start and end points using the touch probe 108. For example, the primary arm 104 can manipulate the touch probe 108 to contact the surface of the work piece at a first position indicative of the weld start point and at a second position indicative of the weld end point. Still, in other embodiments, the robotic welding attachment can learn the weld start and end points using other detection systems such as image detection software and one or more cameras.

In some embodiments, the automated welding operation is initiated (step 1716). The automated welding operation includes using a weld gun to perform a weld, and using a scaler to clean the weld. In some embodiments, the weld gun is the weld gun 110, and the scaler is needle scaler 114. In some embodiments, the automatic welding operation is an automated welding operation as described below according to process 1800.

In some embodiments, the robotic welding attachment positions the robotic arms in a stow position (step 1718). After completing the welding operation the robotic welding attachment, such as robotic welding attachment 16 can position the primary arm 104 and the secondary arm 106 in a stow position to indicate the automated welding operation is complete and the robotic welding attachment 16 is safe to move.

Figure 18:
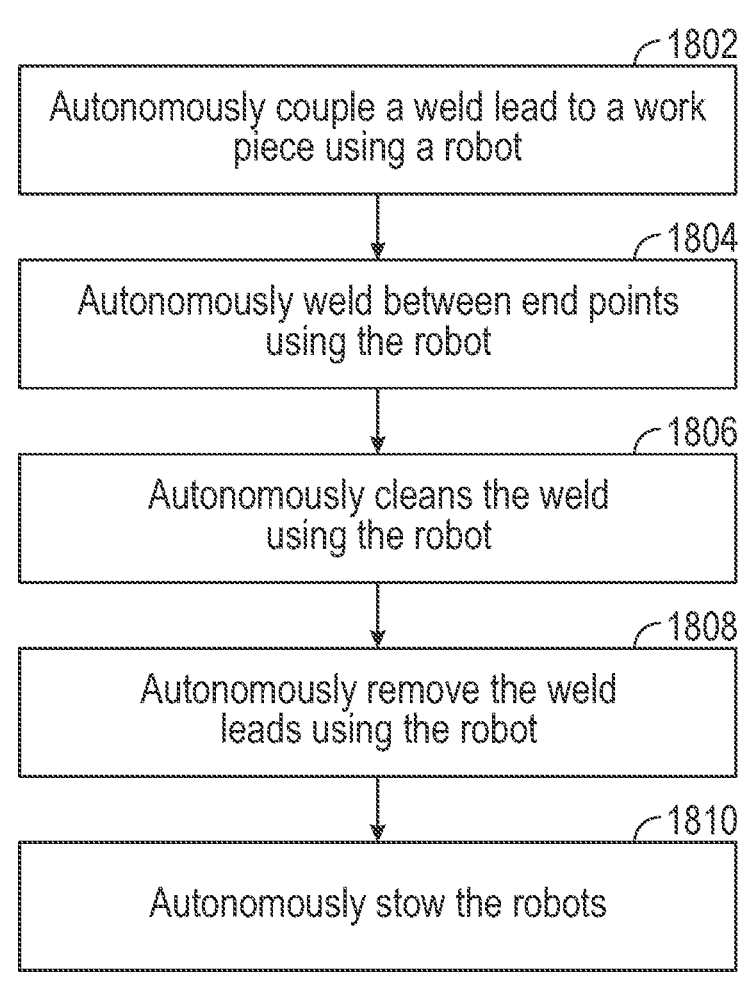
FIG. 18 is a flow diagram of an automated weld performed by the lift device of FIG. 1, according to an exemplary embodiment.

Referring now to FIG. 18, a process 1800 for performing an automated welding operation is shown, according to an exemplary embodiment. In some embodiments, process 1800 is performed by one or more components of the lift device 10. For example, process 1800 can be performed by the robotic welding attachment 16.

In some embodiments, a weld lead is coupled to a work piece autonomously using a robot (step 1804). In some embodiments, the robot includes robotic welding attachment 16, which itself includes the primary arm 104 and the secondary arm 106. The weld lead can be a detachable weld lead such as detachable weld lead 112. In some embodiments, the weld lead is coupled to the work piece at a location indicated as a lead attachment point. The lead attachment point can be learned by the robotic welding attachment 16. In some embodiments, the robotic welding attachment 16 learns the weld attachment point via the touch probe 108. In some embodiments, the lead includes a ground lead and a voltage sensor lead for a welding circuit. The ground lead, when used in addition to a weld gun such as weld gun 110, can complete a weld circuit and facilitate a welding operation. The voltage sensor lead can measure the voltage in the weld circuit to ensure enough voltage is provided.

According to an exemplary embodiment, the weld lead is coupled to the work piece using a stabilizer bar, such as stabilizer bar 500. In some embodiments, the external support is electrically connected to the work piece. In some embodiments, the external support is the work piece itself. In some embodiments, the stabilizer bar can include one or more grounding elements which, such that when the stabilizer bar 500 extends and contacts the external support, the grounding elements are electrically coupled to the work piece, either directly or indirectly via the external support.

In some embodiments, the robot (i.e., the robotic welding attachment 16) autonomously welds between a weld start point and a weld end point (step 1806). The weld start and end points can be learned by the robotic welding attachment using a touch probe such as touch probe 108. In some embodiments, the robotic welding attachment 16 performs the weld using a weld gun such as weld gun 110. The robotic welding attachment 16 can manipulate the weld gun 110 to perform the weld according to one of several prepro-grammed weld paths.

In some embodiments, the robot (i.e., the robotic welding attachment 16) autonomously cleans the weld (step 1806). The robotic welding attachment 16 can clean the weld using a needle scaler, such as needle scaler 114. For example, in some embodiments, after performing the weld primary arm 104 can return to a stow position and secondary arm 106 can manipulate a needle scaler such as needle scaler 114 to remove the scale from the weld line. In some embodiments, the secondary arm 106 can follow the same weld start and end points. In some embodiments, the robotic welding attachment 16 can clean the weld using any other tools, for example a grinding wheel. According to an exemplary embodiment, after step 1808 in some embodiments process 1800 returns to steps 1804 and does an additional pass on the weld. In some embodiments, a weld can requires multiple weld and needling passes.

In some embodiments, the robot (i.e., the robotic welding attachment 16) autonomously removes the weld leads. For example, after completing the weld (i.e., welding and cleaning between the weld start point and the weld end point) the secondary arm 106 can return to the lead attachment position and remove the detachable lead 112. In some embodiments, the secondary arm 106 first couples to the detachable lead 112. Then, the attachment mechanism such as controllable magnet 122, deactivates and released the detachable lead from the work surface. According to the exemplary embodiment in which the stabilizer bar 500 acts as the ground elements, step 1808 may be performed after step 1810.

In some embodiments, the robots (i.e., the primary arm 104 and the secondary arm 106) are then autonomously moved to the stow position. In some embodiments, As used herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Figure 19:
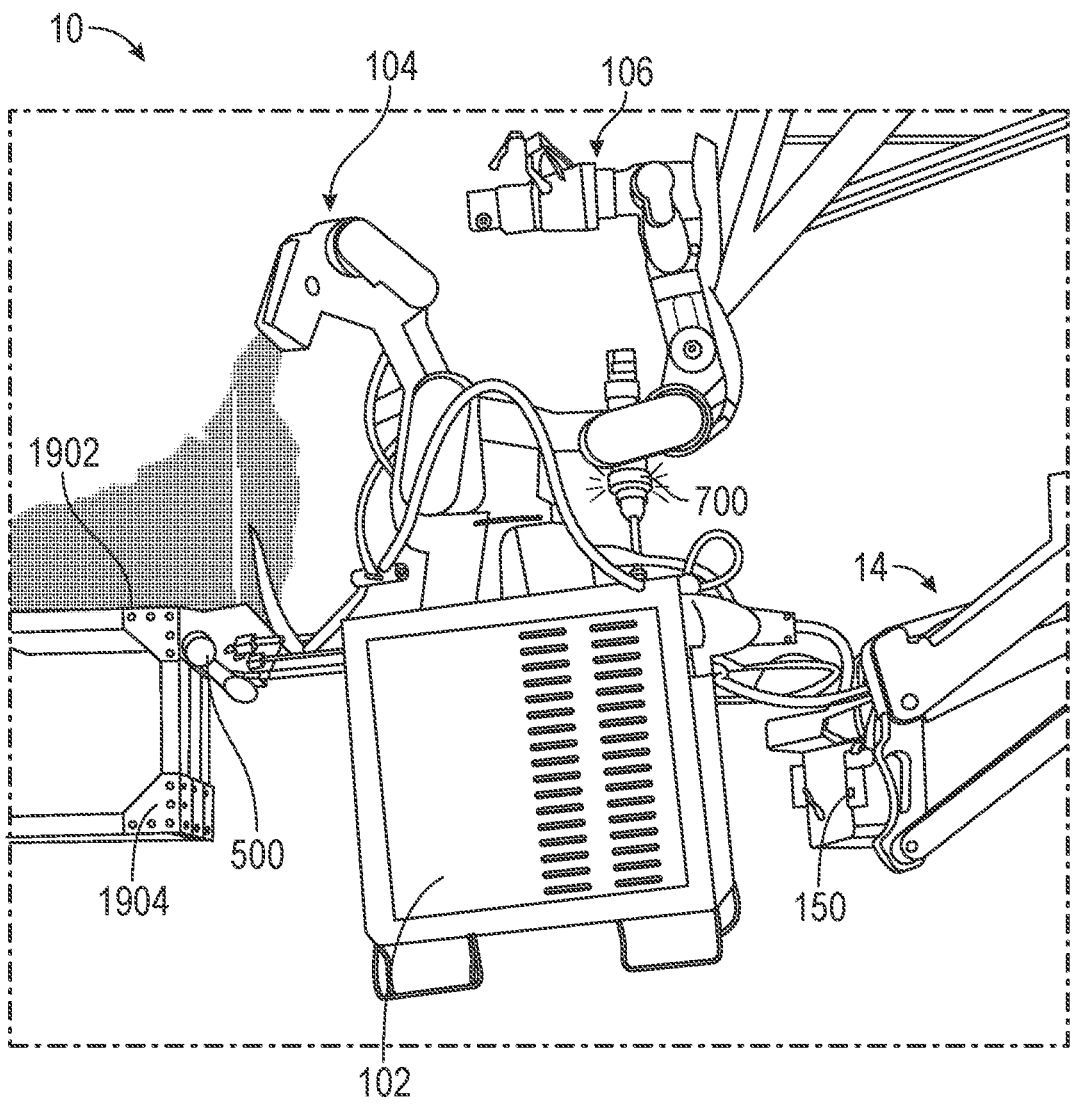
FIG. 19 is a perspective view of the robotic welding attachment 16 performing a weld, according to an exemplary embodiment.

Referring now to the exemplary embodiment in FIG. 19, the lift device 10 is shown performing a welding operation. According to the exemplary embodiment, the lift apparatus 14 raises robotic welding attachment 16 and positions the robotic welding attachment 16 to address a work piece 1902. In some embodiments, the angular position of the robotic welding attachment 16 is adjusted by the mechanical coupling 150. The stabilizer bar 500 is extended and contacts an external support, shown as frame 1904. According to the exemplary embodiment, frame 1904 supports work piece 1902. While the work piece 1902 is shown to lie flat, i.e., in a plane substantially parallel with the plane of the ground, in some embodiments the work piece 1902 can be vertical, or positioned at any other angle. According to the exemplary embodiment, the secondary arm 106 is retracted. In some embodiments, the secondary arm 106 is retracted to create more clear space for the primary arm 104 to operate. Also and/or alternatively, in some embodiments the secondary arm 106 is retracted to provide a better view of the work piece 1902 to the secondary arm wrist camera 120. According to the exemplary embodiment shown in FIG. 19, the primary arm 104 is performing a welding operation.

Configuration of Exemplary Embodiments

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure. Additionally, references herein to the specification of a primary arm and a secondary arm are merely used to provide clarity to the figures. It should be noted that any acts, operations, movements, etc., performed by the primary arm can also be performed by the secondary arm (and/or additional arms), and vice versa.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10 and the systems and components thereof as shown in the various exemplary embodiments is illustrative only. Additionally, any element disclosed in one embodiment may be incorporated or utilized with any other embodiment disclosed herein.

The invention claimed is:

1. A lift device comprising:
an actuator configured to raise and lower a robotic attachment; and
a frame configured to support the actuator, the frame including a prime mover configured to rotate one or more wheels coupled to the frame,
wherein the robotic attachment comprises:
a base;
a robotic implement supported by the base and moveable independent of the base;
a stabilizer bar coupled to the base and moveable independent of the base;
a stabilizer bar actuator configured to move the stabilizer bar relative to the base; and
a lock configured to selectively hold the stabilizer bar in position, wherein the stabilizer bar actuator is configured to move the stabilizer bar between a first position and second position relative to the base to engage with an external support to generate a stabilizing force for the robotic attachment, and wherein a first minimum distance between the stabilizer bar and the base in the first position is less than a second minimum distance between the stabilizer bar and the base in the second position, wherein the lock is moveable between a disengaged position and an engaged position, and wherein in the engaged position the stabilizing force is transferred from the stabilizer bar to the base via the lock when the lock is engaged, wherein in the engaged position the stabilizer bar actuator is substantially removed from a force path between the stabilizer bar and the base, and wherein the stabilizer bar actuator is further configured to limit the stabilizing force exerted by the stabilizer bar onto the external support to a predetermined maximum force.

2. The lift device of claim 1, wherein the robotic attachment further comprises at least one environmental sensor, wherein the at least one environmental sensor is configured to sense an environmental condition when the robotic attachment is raised by the lift device.

3. The lift device of claim 2, further comprising a control system communicably coupled to the lift device and the robotic attachment, wherein the control system comprises a processing circuit configured to control operation of the robotic implement based on a signal from the at least one environmental sensor.

4. The lift device of claim 2, wherein the at least one environmental sensor is at least one of a temperature sensor, a humidity sensor, a pressure sensor, a wind sensor, or a vibration sensor.

5. The lift device of claim 1, wherein the robotic attachment further comprises:

a single-phase power circuit coupled to the base and configured to receive single-phase power from the frame;

a three-phase power circuit coupled to the base and configured to receive three-phase power from the frame; and a switching circuit configured to automatically switch between the single-phase power circuit and the three-phase power circuit based on a power input provided by the frame.

6. The lift device of claim 1, wherein the stabilizer bar is comprised of a plastic, rubber, silicone, or polyurethane material.

7. The lift device of claim 6, wherein the stabilizer bar further comprises a bumper.

8. The lift device of claim 7, wherein the bumper is configured to cushion an impact between the stabilizer bar and the external support.

9. The lift device of claim 1, wherein the stabilizer bar actuator is configured to be a linear electric actuator.

10. The lift device of claim 1, wherein the predetermined maximum force is the force at which the lift device can no longer maintain positioning of the robotic attachment.

11. The lift device of claim 1, wherein the stabilizer bar actuator is further configured to shorten the distance between the stabilizer bar and the base when the predetermined maximum force is exceeded, readjusting the position of the robotic attachment to reduce the force exerted by the stabilizer bar.

* * * * *